(12) United States Patent
Yamagishi

(10) Patent No.: US 10,499,094 B2
(45) Date of Patent: Dec. 3, 2019

(54) TRANSMISSION APPARATUS, TRANSMITTING METHOD, RECEPTION APPARATUS, AND RECEIVING METHOD

(71) Applicant: SATURN LICENSING LLC, New York, NY (US)

(72) Inventor: Yasuaki Yamagishi, Kanagawa (JP)

(73) Assignee: SATURN LICENSING LLC, New York, NY (US)

( * ) Notice: Subject to any disclaimer, the term of this patent is extended or adjusted under 35 U.S.C. 154(b) by 163 days.

(21) Appl. No.: 15/021,116

(22) PCT Filed: Oct. 17, 2014

(86) PCT No.: PCT/JP2014/077658
§ 371 (c)(1),
(2) Date: Mar. 10, 2016

(87) PCT Pub. No.: WO2015/064383
PCT Pub. Date: May 7, 2015

(65) Prior Publication Data
US 2016/0219311 A1 Jul. 28, 2016

(30) Foreign Application Priority Data
Oct. 30, 2013 (JP) ................................. 2013-225540

(51) Int. Cl.
*H04L 29/08* (2006.01)
*H04N 21/235* (2011.01)
(Continued)

(52) U.S. Cl.
CPC ..... *H04N 21/2353* (2013.01); *H04L 65/4076* (2013.01); *H04L 65/4084* (2013.01);
(Continued)

(58) Field of Classification Search
CPC .................................................. H04L 29/0809
See application file for complete search history.

(56) References Cited

U.S. PATENT DOCUMENTS

| 2010/0189059 | A1 | 7/2010 | Yang |
| 2012/0023254 | A1* | 1/2012 | Park .................... H04L 65/4084 709/231 |

(Continued)

FOREIGN PATENT DOCUMENTS

| CN | 101330492 A | 12/2008 |
| CN | 102740159 A | 10/2012 |

(Continued)

OTHER PUBLICATIONS

Mitsuhiro Hirabayashi, "Realizing the Uninterrupted Video Distribution in the Existing Web Server; An Exposition on 'MPEG-DASH', the Next-Generation Standard of Video Distribution", Invited Paper, 2012, (with English translation), 21 pages.

(Continued)

*Primary Examiner* — Michael H Hong
(74) *Attorney, Agent, or Firm* — Oblon, McClelland, Maier & Neustadt, L.L.P.

(57) ABSTRACT

The present technique relates to a transmission apparatus, a transmitting method, a reception apparatus, and a receiving method for promptly distributing data. An http response having a part of a fragment and a hypertext transfer protocol (http) header is distributed. The http header includes a sequence number representing an order of the fragment and a version representing an order of a part of the fragment in the fragment. The present technique is applied to, for example, a case where content is distributed by multicast and the like.

19 Claims, 25 Drawing Sheets

(51) Int. Cl.
  *H04N 21/633*   (2011.01)
  *H04N 21/6405*  (2011.01)
  *H04N 21/6437*  (2011.01)
  *H04N 21/2343*  (2011.01)
  *H04N 21/435*   (2011.01)
  *H04N 21/61*    (2011.01)
  *H04N 21/6408*  (2011.01)
  *H04N 21/845*   (2011.01)
  *H04L 29/06*    (2006.01)
  *H04N 21/2187*  (2011.01)

(52) U.S. Cl.
  CPC ............ *H04L 65/608* (2013.01); *H04L 67/02* (2013.01); *H04N 21/2187* (2013.01); *H04N 21/23439* (2013.01); *H04N 21/435* (2013.01); *H04N 21/6125* (2013.01); *H04N 21/633* (2013.01); *H04N 21/6405* (2013.01); *H04N 21/6408* (2013.01); *H04N 21/6437* (2013.01); *H04N 21/8456* (2013.01); *H04L 29/0809* (2013.01)

(56) References Cited

U.S. PATENT DOCUMENTS

| | | | | |
|---|---|---|---|---|
| 2012/0254456 | A1* | 10/2012 | Visharam | H04N 21/2343 709/231 |
| 2012/0320266 | A1 | 12/2012 | Dewa et al. | |
| 2013/0124683 | A1* | 5/2013 | Watanabe | H04N 21/4622 709/217 |
| 2014/0137168 | A1 | 5/2014 | Takahashi et al. | |
| 2014/0259180 | A1* | 9/2014 | Shen | G06F 21/10 726/27 |

FOREIGN PATENT DOCUMENTS

| | | |
|---|---|---|
| CN | 102833588 A | 12/2012 |
| EP | 3 125 563 A1 | 2/2017 |
| JP | 2011 147025 | 7/2011 |
| JP | 2013 38766 | 2/2013 |
| WO | 2011 102792 A1 | 8/2011 |
| WO | 2012 046487 A1 | 4/2012 |

OTHER PUBLICATIONS

International Search Report dated Jan. 20, 2015, in PCT/JP2014/077658 Filed Oct. 17, 2014.
Extended European Search Report dated May 19, 2017 in Patent Application No. 14857456.9.
Thomas Stockhammer, et al., "Dash in Mobile Networks and Services" Visual Communications and Image Processing, IEEE, XP032309240, Nov. 27, 2012, 6 Pages.
Notification of the First Office Action issued in corresponding Chinese Application No. 2014800584716 dated Sep. 27, 2018 with English translation.

* cited by examiner

FIG. 12

```
    ┌ HTTP/1.1 206 Partial Content
    │ Date: Fri, 04 Oct 2013 11:14:19 GMT
100 ┤ Content-type: multipart/byteranges; boundary=SEPARATER_STRING
    │ X-MoofSeqNumVersion: sqn=1, v=1  ──101
    └ X-NTPTimeStamp: 2890844526  ──102

--SEPARATER_STRING                                              ┐
    Content-type: application/mp4                                   ├103
    Content-range: bytes 492-499/124567654   (BYTE RANGE OF styp)   ┘

(···BYTE SEQUENCE OF styp···)
    --SEPARATER_STRING                                                  ┐
    Content-type: application/mp4                                       ├104
    Content-range: bytes 500-991/124567654   (BYTE RANGE OF moof SUBSET 64) ┘

(···BYTE SEQUENCE OF moof SUBSET 64···)
    --SEPARATER_STRING                                                  ┐
    Content-type: application/mp4                                       ├105
    Content-range: bytes 992-999/124567654   (BYTE RANGE OF mdat HEADER 55) ┘

(···BYTE SEQUENCE OF mdat HEADER 55···)
    --SEPARATER_STRING                                                  ┐
    Content-type: application/mp4                                       ├106
    Content-range: bytes 1000-4999/124567654  (BYTE RANGE OF SAMPLE GROUP 56) ┘

(···BYTE SEQUENCE OF SAMPLE GROUP 56···)
    --SEPARATER_STRING--  ──107
```

FIG. 13

```
HTTP/1.1 206 Partial Content
Date: Fri, 04 Oct 2013 11:14:20 GMT
Content-type: multipart/byteranges; boundary=SEPARATER_STRING
X-MoofSeqNumVersion: sqn=1, v=2          ~121
X-NTPTimeStamp: 2890844526   ~122
X-SampleCountStart: n1   ~123

--SEPARATER_STRING
Content-type: application/mp4
Content-range: bytes 500-991/124567654   (BYTE RANGE OF moof SUBSET 73)

(...BYTE SEQUENCE OF moof SUBSET 73...)
--SEPARATER_STRING
Content-type: application/mp4
Content-range: bytes 5000-7999/124567654   (BYTE RANGE OF SAMPLE GROUP 57)

(...BYTE SEQUENCE OF SAMPLE GROUP 57...)
--SEPARATER_STRING--   ~126
```

120 { (header block lines)
124 } (first part)
125 } (second part)

FIG. 21

| FIELD | SIZE (bit) | VALUE |
|---|---|---|
| HET | 8 | 120, HEADER TYPE |
| HEL | 8 | INTEGER VALUE OF ZERO TO 255 (REFERRED TO AS HELN), EXTENSION HEADER LENGTH (32bit*HELN) |
| Filtering Scheme URI | 8 | SchemeURI FOR IDENTIFYING FOLLOWING FILTERING PARAMETER STRUCTURE. |
| Filtering Parameter Length | 8 | INTEGER VALUE OF ZERO TO 255 (REFERRED TO AS FPLN), LENGTH OF Filtering Parameter (8bit*FPLN) |
| Filtering Parameter | 8*FPLN | CONTENT OF Filtering Parameter. STRUCTURE IS SPECIFIED BY Filtering Scheme URI. |

FIG. 22

| FIELD | SIZE (bit) | VALUE |
|---|---|---|
| Track Reference Index | 8 | INTEGER VALUE FOR IDENTIFYING MEDIA TRACK OF ZERO TO 255. |
| Priority | 8 | INDEX TO RANK PROCESSING PRIORITY IN A SINGLE FILE UNIT (HAVING SAME TOI) FROM ZERO TO 255 (THE LARGER THE VALUE IS, THE LOWER THE PRIORITY IS). |
| Dependency Counter | 8 | VALUE INDICATING WHETHER SOME FOLLOWING LCT PACKETS DEPEND ON PROCESSING OF THIS LCT PACKET. WHEN VALUE IS N, IT IS INDICATED THAT FOLLOWING CONTINUOUS N LCT PACKETS DEPEND ON PROCESSING OF THIS LCT PACKET. |
| MVC Filter Length | 8 | Boolean VALUE, WHEN True IS SHOWN, THIS INDICATES THAT MVC Filter EXISTS. |
| MVC Filter | 32 | STRUCTURE FOR STORING PARAMETER TO REALIZE FILTERING BY PARAMETER RELATING TO MVC (Multi View Coding). |

FIG. 23

| PRID(6bits) | TID(3bits) | VID(10bits) | Reserved(13bits) |

PRID: 6 bits
priority_id. This flag specifies a priority identifier for the NAL unit. A lower value of PRID indicates a higher priority.

TID: 3 bits
temporal_id. This component specifies the temporal layer (or frame rate) hierarchy. Informally put, a temporal layer consisting of view component with a less temporal_id corresponds to a lower frame rate. A given temporal layer typically depends on the lower temporal layers (i.e. the temporal layers with less temporal_id values) but never depends on any higher temporal layer (i.e. a temporal layers with higher temporal_id value).

VID: 10 bits
view_id. This component specifies the view identifier of the view the NAL unit belongs to.

Reserved: 13bits

TRANSMISSION APPARATUS, TRANSMITTING METHOD, RECEPTION APPARATUS, AND RECEIVING METHOD

TECHNICAL FIELD

The present technique relates to a transmission apparatus, a transmitting method, a reception apparatus, and a receiving method, and specifically, for example, to a transmission apparatus, a transmitting method, a reception apparatus, and a receiving method which can promptly distribute data.

BACKGROUND ART

In recent years, the mainstream of a streaming service on the Internet has been over the top video (OTT-V). For example, moving picture experts group-dynamic adaptive streaming over hypertext transfer protocol (HTTP) (MPEG-DASH) (referred to as DASH below) has started to be widely used as a basic technique of the OTT-V.

In the DASH, for example, media presentation description (MPD) as metadata including attribute information to optimally select streams having different characteristics from the same source is informed from a server which distributes a stream to a client which receives the stream. The client realizes a network environment adaptive type streaming by using the MPD (for example, refer to Non-Patent Document 1).

That is, in the DASH, the server prepares a plurality of streams having different image quality and image size according to communication environment of a distribution path, the capacity and the state of the client, and the like as the same content.

On the other hand, the client adaptively selects a stream which can be received by the client and which is suitable for the capacity of the client (decode capacity and the like) from among the plurality of streams which is prepared by the server. Then, the client receives the stream and reproduces it.

In the DASH, the metadata which is referred to as the MPD and is used to reproduce and control the content is distributed from the server to the client so that the client can adaptively select and receive the stream.

In the MPD, a uniform resource locator (URL) as an address of a segment (media data such as Audio/Video/Subtitle) which is obtained by dividing the content is written. The client transmits an http request to a (web) server to be a distribution source of the content based on the URL and the like written in the MPD and receives and reproduces the segment which is distributed by the server according to the http request by unicast.

CITATION LIST

Non-Patent Document

Non-Patent Document 1: "Achieving Uninterrupted Video Streaming Using Existing Web Servers", Mitsuhiro HIRABAYASHI, NIKKEI ELECTRONICS, Mar. 19, 2012

SUMMARY OF THE INVENTION

Problems to be Solved by the Invention

Distribution of the content by the DASH is realized by point-to-point http streaming. Therefore, for example, when it is applied to the streaming of the content (program) such as a sports broadcast which can be concurrently viewed by a large number of users, it is necessary to use (be supported by) a contents delivery network (CDN) such as the Akamai.

However, even when the CDN is used, it is difficult to request a scalability equal to existing broadcast distribution because of a restriction of the cost of the CDN.

The DASH has a streaming protocol for using the http as a base. However, regarding the content which is concurrently viewed by a plurality of users, for example, it is desirable that a load of a network resource is reduced by performing simultaneous multiple distribution by using a multicast or broadcast (MC/BC) bearer such as a real-time transport protocol (RTP) and a file delivery over unidirectional transport (FLUTE) together.

In the current DASH, a file is distributed in a segment unit while having the segment (file thereof) which is obtained by dividing the stream of the content as a file distribution unit (control target) in the DASH.

Therefore, in the current DASH, when the content is distributed by multicast (including broadcast distribution), it is necessary to wait for the distribution of the content before the segment is generated.

After this, it is predicted that the moving image distribution with higher quality will be generally performed. In this case, a bit rate of the stream of the content will increase.

When the bit rate of the stream of the content is large, a band of the network is compressed and it is necessary to perform shaping in a case where the content is distributed, that is, bulk transfer is performed in a segment unit after waiting for the completion of the generation of the segment.

Therefore, when the content is distributed in a segment unit after waiting for the completion of the generation of the segment, the reception of the content by the client and the start of buffering are finally delayed. Therefore, a technique for promptly distributing the content is required.

The present technique has been made in consideration of this situation, and the present technique can promptly distribute the data of the content and the like.

Solutions to Problems

A transmission apparatus according to the present technique includes a distribution unit which distributes an http response including a part of a fragment and a hypertext transfer protocol (http) header including a sequence number representing an order of the fragment and a version representing an order of a part of the fragment in the fragment.

A transmitting method according to the present technique includes a step for distributing an http response including a part of a fragment and a hypertext transfer protocol (http) header including a sequence number representing an order of the fragment and a version representing an order of a part of the fragment in the fragment.

According to the transmission apparatus and the transmitting method according to the present technique described above, the http response including a part of the fragment and the hypertext transfer protocol (http) header is distributed. The http header includes the sequence number representing the order of the fragment and the version representing the order of a part of the fragment in the fragment.

A reception apparatus according to the present technique includes a receiving unit which receives an http response including a part of a fragment and a hypertext transfer protocol (http) header including a sequence number representing an order of the fragment and a version representing an order of a part of the fragment in the fragment.

A receiving method according to the present technique includes a step for receiving an http response including a part of a fragment and a hypertext transfer protocol (http) header including a sequence number representing an order of the fragment and a version representing an order of a part of the fragment in the fragment.

According to the reception apparatus and the receiving method according to the present technique described above, the http response including a part of the fragment and the hypertext transfer protocol (http) header is received. The http header includes the sequence number representing the order of the fragment and the version representing the order of a part of the fragment in the fragment.

The transmission apparatus and the reception apparatus may be independent devices and may be an inner block forming a single device.

Effects of the Invention

According to the present technique, data can be promptly distributed.

The effects described herein are not limited, and the effect may be any effects described in the present disclosure.

BRIEF DESCRIPTION OF DRAWINGS

FIG. 12 is a diagram of an exemplary http response as a portion 60.

FIG. 13 is a diagram of an exemplary http response as a portion 70.

FIG. 21 is a diagram of an exemplary definition of a new extension header for storing a priority parameter.

FIG. 22 is a diagram of an exemplary definition of the priority parameter (Filtering Parameter).

FIG. 23 is a diagram of an exemplary definition of an MVC filter.

MODE FOR CARRYING OUT THE INVENTION

Figure 1:
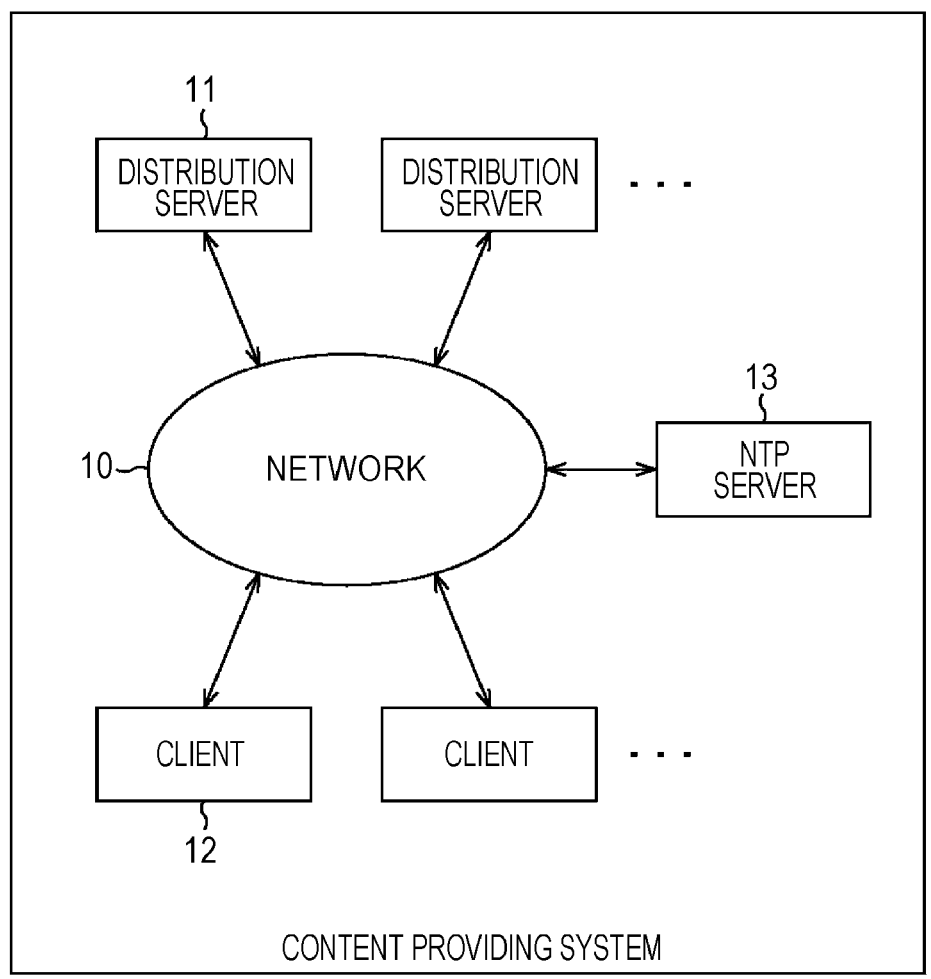
FIG. 1 is a block diagram of an exemplary structure of an embodiment of a content providing system to which the present technique has been applied.

Embodiment of Content Providing System to which the Present Technique is Applied FIG. 1 is a block diagram of an exemplary structure of an embodiment of a content providing system to which the present technique has been applied.

In FIG. 1, the content providing system includes one or more distribution servers 11, one or more clients 12, and a network time protocol (NTP) server 13 which are connected to a network 10.

In the content providing system in FIG. 1, the distribution server 11 provides content to the client 12 via the network 10 by using the DASH.

Here, in the current DASH, streaming is performed by unicast on an over the top/contents delivery network (OTT/CDN). However, in the content providing system in FIG. 1, unicast distribution is performed to the content, and in addition, for example, the multicast distribution can be performed on a multicast network in which broadcasting can be performed with an ensured quality on a portable network (eMBMS and the like).

The network 10 includes a bidirectional network such as Internet which can perform unicast and multicast distribution and a broadcast system network which can perform broadcast and multicast. As the network 10, for example, a multimedia broadcast multicast service (MBMS) (including evolved MBMS (eMBMS)) of a 3rd generation partnership project (3GPP) can be employed.

For example, the distribution server 11 corresponds to a broadcasting station and distributes a plurality of streams having the same content and having different bit rates and image sizes from each other as a program of a channel (service) of the broadcasting station via the network 10.

The client 12 receives the content (stream thereof) distributed by the distribution server 11 via the network 10 and reproduces it.

The NTP server 13 provides an NTP time which is time information according to a coordinated universal time (UTC) time format via the network 10.

The distribution server 11 and the client 12 can be operated as being synchronized with the NTP time provided from the NTP server 13.

The program distributed by the distribution server 11 may be a program distributed in real time (live program) and may be a recorded program.

<Exemplary Structure of Distribution Server 11>

Figure 2:
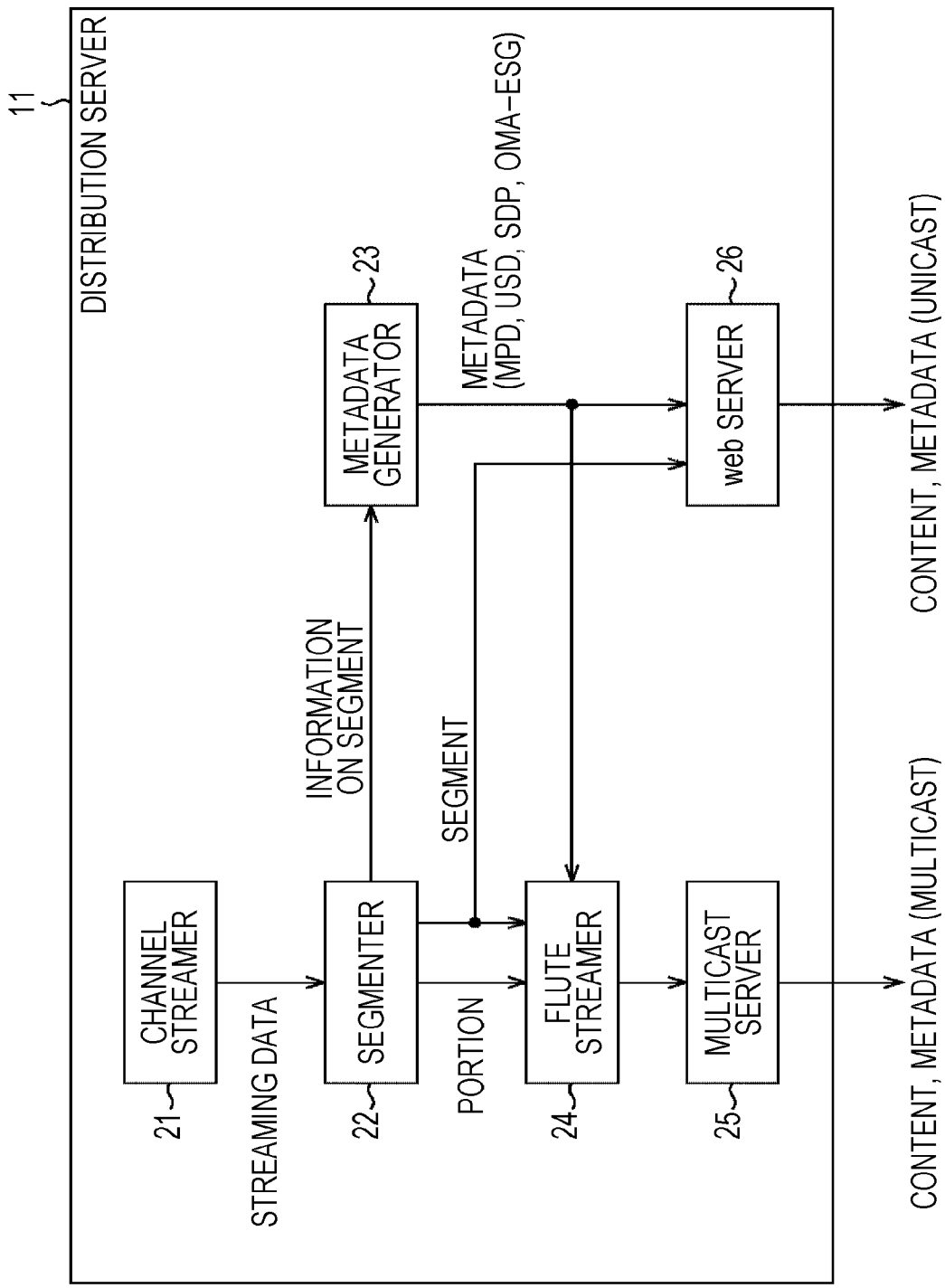
FIG. 2 is a block diagram of an exemplary structure of a distribution server 11.

FIG. 2 is a block diagram of an exemplary structure of the distribution server 11 in FIG. 1.

In FIG. 2, the distribution server 11 includes a channel streamer 21, a segmenter 22, a metadata generator 23, a file delivery over unidirectional transport (FLUTE) streamer 24, a multicast server 25, and a web server 26.

Here, the channel streamer 21 to the web server 26 can be arranged at one spot in the network 10 and can be distributed and arranged in the network 10. When the channel streamer 21 to the web server 26 are distributed and arranged in the network 10, communication between them can be performed via a dedicated line and any other communication lines in addition to the network 10.

The channel streamer 21 manages videos, audio, and subtitles as source data of the content to be distributed as the program of the channel of the distribution server 11 and generates a plurality of streaming data of which a bit rate is different from the video and the like as the source data of the content, and then, the channel streamer 21 supplies it to the segmenter 22.

The segmenter 22 generates a file of the segment in which each streaming data from the channel streamer 21 is divided into a time direction and supplies it to the FLUTE streamer 24 and the web server 26.

That is, the segmenter 22 divides the streaming data and generates, for example, a fragment of fragmentedMP4 (moof and mdat). Then, the segmenter 22 generates the file of the segment by collecting one or more fragments.

Also, the segmenter 22 supplies relationship information to the metadata generator 23. The relationship information relates to a segment which is necessary for the generation of MPD, such as an URL of the segment (URL of a server for providing the segment (for example, the distribution server 11)) and a range of the segment (information indicating a range in the content such as the video included in the segment).

Here, the segmenter 22 generates a portion to be described which is formed of a part of the fragment during the generation of the fragment not the segment which is formed by collecting the fragments and can supply the portion to the FLUTE streamer 24 instead of the segment.

The metadata generator 23 generates, for example, a combination of a user service description (USD) of the MBMS, the MPD of the DASH, and a session description protocol (SDP) (file) of an Internet engineering task force (IETF) or a combination of the USD, the MPD, the SDP, and open mobile alliance-electronic service guide (OMA-ESG) as metadata of the content necessary for receiving the segment by the client 12 by using the relationship information of the segment supplied from the segmenter 22.

That is, the metadata generator 23 generates the MPD, in which the URL of the segment and the like are written, necessary for receiving the segment by the client 12 and reproducing and controlling it by using the relationship information of the segment supplied from the segmenter 22.

In addition, the metadata generator 23 generates the USD and the SDP or the USD, the SDP, and the OMA-ESG as announcement information for announcing the multicast distribution (including broadcast distribution) of the content.

The metadata generator 23 supplies the metadata to the FLUTE streamer 24 and the web server 26.

The FLUTE streamer 24 stores the content (segment or portion thereof) supplied from the segmenter 22 to a FLUTE packet and supplies it to the multicast server 25. The FLUTE packet is a layered coding transport (LCT) packet (in the present embodiment, this means a packet including the LCT header and including an asynchronous layered coding (ALC) packet).

Also, the FLUTE streamer 24 stores the metadata supplied from the metadata generator 23 to the LCT packet and supplies it to the multicast server 25.

The multicast server 25 performs (FLUTE) multicast distribution to the LCT packet from the FLUTE streamer 24 via the network 10.

Here, as described above, since the content (segment or portion thereof) and the metadata are stored in the LCT packet from the FLUTE streamer 24, the multicast server 25 distributes the content and the metadata by multicast.

The web server 26 performs (http) unicast distribution to the metadata from the metadata generator 23 and the content (segment thereof) from the segmenter 22 to the client 12 via the network 10 according to a request (http request) from the client 12.

Here, as described above, the multicast server 25 and the web server 26 function as a distribution unit for distributing the content and the metadata.

In FIG. 2, the web server 26 distributes the segment of the content by unicast. However, similarly to the multicast server 25, the web server 26 can perform the unicast distribution to the portion not the segment of the content.

<Exemplary Structure of Client 12>

Figure 3:
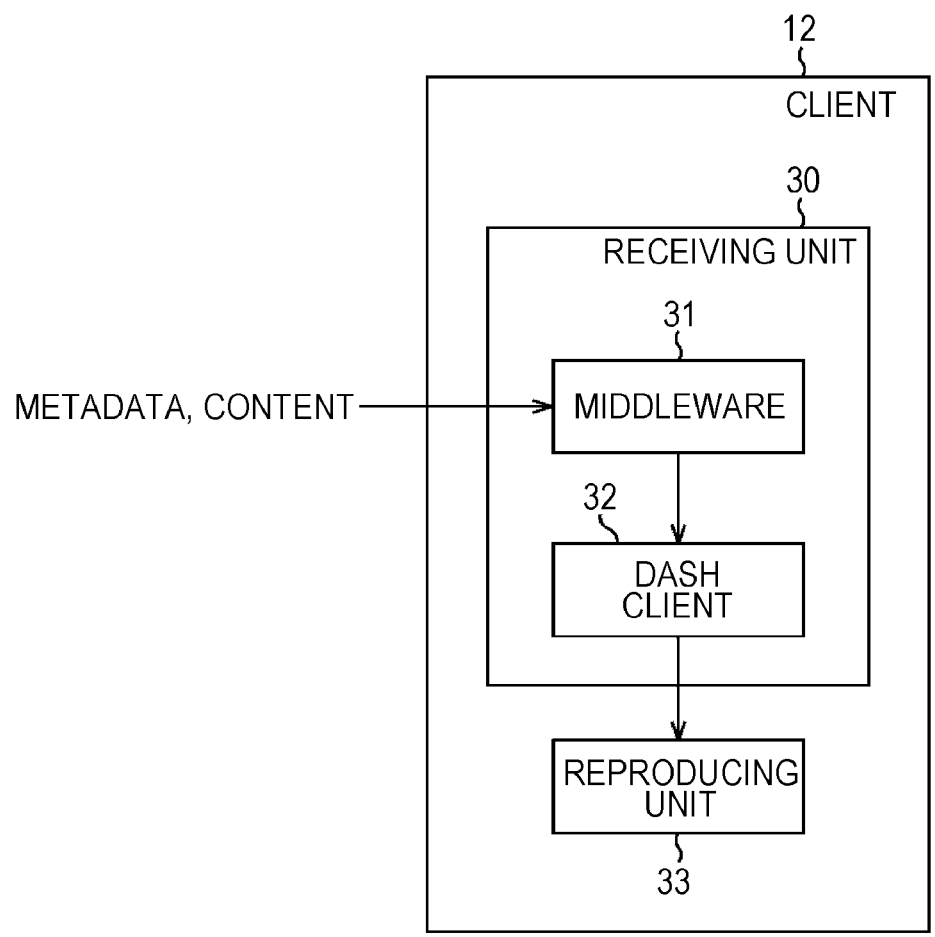
FIG. 3 is a block diagram of an exemplary structure of a client 12.

FIG. 3 is a block diagram of an exemplary structure of the client 12 in FIG. 1.

The client 12 includes a receiving unit 30 and a reproducing unit 33 in FIG. 3.

For example, the receiving unit 30 functions as the receiving unit for receiving the content and the metadata distributed from the distribution server 11 according to an operation to the client 12 by a user.

That is, the receiving unit 30 receives the metadata distributed from the distribution server 11. In addition, for example, the receiving unit 30 receives the content (segment and portion thereof) distributed from the distribution server 11 based on the metadata received from the distribution server 11 according to the operation to the client 12 by the user.

The receiving unit 30 supplies the content received from the distribution server 11 to the reproducing unit 33 and controls the reproduction of the content by the reproducing unit 33 based on the metadata received from the distribution server 11.

The reproducing unit 33 reproduces the video, the audio, and the subtitle as the content supplied from the receiving unit 30 in accordance with the control by the receiving unit 30.

Here, the receiving unit 30 has a middleware 31 and a DASH client 32.

The DASH client 32 outputs the http request for requesting the MPD and the http request for requesting the segment of the content to the middleware 31 as necessary.

The middleware 31 receives the content (segment and portion thereof) and the metadata distributed from the distribution server 11 by multicast as necessary. When the DASH client 32 outputs the http request, the middleware 31 determines whether the multicast distribution is performed to the MPD and the segment requested by the http request based on the metadata.

When the MPD and the segment requested by the http request output from the DASH client 32 are distributed by multicast, the middleware 31 receives the MPD and the segment (or a portion including a part of the segment) which are distributed by multicast and supplies them to the DASH client 32.

When the middleware 31 has already received the MPD and the segment requested by the http request output from the DASH client 32, the middleware 31 supplies the received MPD and segment to the DASH client 32.

On the other hand, when the MPD and the segment requested by the http request output from the DASH client 32 are not distributed by multicast, the middleware 31 transmits the http request output from the DASH client 32 to the network 10 (the distribution server 11 thereof) as it is. The middleware 31 receives the MPD and the segment distributed by unicast (from the distribution server 11) according to the http request and supplies them to the DASH client 32.

Therefore, similarly to a general DASH client, the DASH client 32 outputs the http request for requesting the necessary MPD and segment and receives the MPD and the segment supplied from the middleware 31 and performs processing to them according to the http request.

<Processing of Content Providing System>

Figure 4:
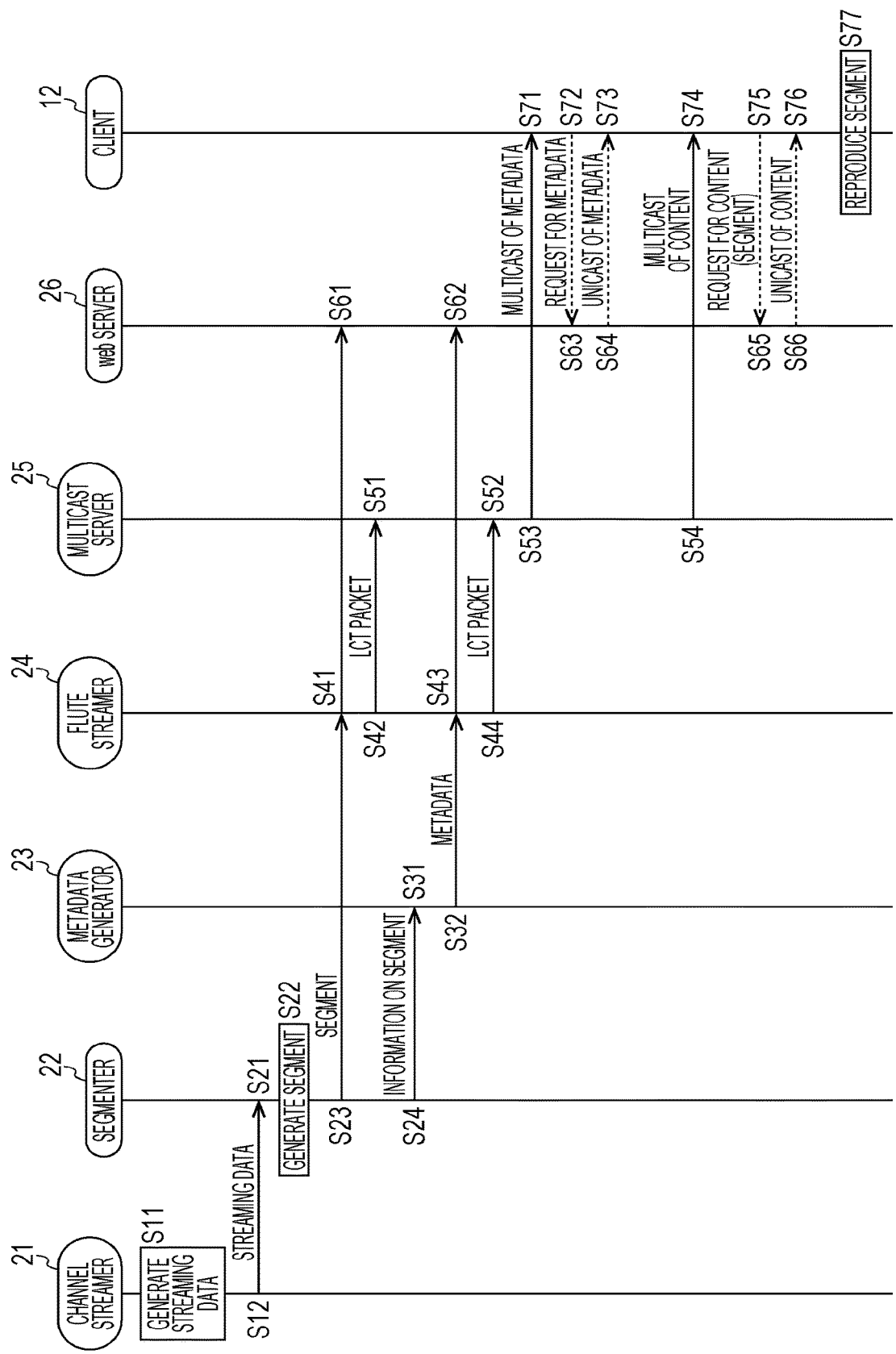
FIG. 4 is a diagram to describe exemplary processing for providing content by the content providing system.

FIG. 4 is a diagram to describe exemplary processing for providing the content by the content providing system in FIG. 1.

The channel streamer 21 (FIG. 2) generates a plurality of streaming data having different bit rates from the video and the like as the source data of the content to be distributed as the program of the channel of the distribution server 11 in step S11.

The channel streamer 21 supplies the plurality of streaming data having different bit rates of the content to the segmenter 22 in step S12.

The segmenter 22 (FIG. 2) receives the content (the plurality of streaming data thereof) supplied from the channel streamer 21 in step S21.

The segmenter 22 generates the segment, which is a file distribution unit of the DASH, from the content from the channel streamer 21 in step S22 and supplies the segment to the FLUTE streamer 24 and the web server 26 in step S23.

In addition, the segmenter 22 generates the relationship information of the segment and supplies it to the metadata generator 23 in step S24.

In step S31, the metadata generator 23 (FIG. 2) receives the relationship information of the segment supplied from the segmenter 22 in step S24.

The metadata generator 23 generates the metadata of the content by using the relationship information from the segmenter 22 and the like and supplies it to the FLUTE streamer 24 and the web server 26 in step S32.

In step S41, the FLUTE streamer 24 (FIG. 2) receives the content (the segment thereof) supplied in step S23 from the segmenter 22. The FLUTE streamer 24 generates the LCT packet including the content and supplies it to the multicast server 25 in step S42.

In addition, the FLUTE streamer 24 receives the metadata supplied in step S32 from the metadata generator 23 in step S43. The FLUTE streamer 24 generates the LCT packet including the metadata and supplies it to the multicast server 25 in step S44.

In step S51, the multicast server 25 (FIG. 2) receives the LCT packet including the content supplied in step S42 from the FLUTE streamer 24. The multicast server 25 receives the LCT packet including the metadata in step S52.

The multicast server 25 performs the multicast distribution to the LCT packet including the metadata from the FLUTE streamer 24 in step S53 and performs the multicast distribution to the LCT packet including the content from the FLUTE streamer 24 in step S54.

The web server 26 (FIG. 2) receives the content (the segment thereof) supplied in step S23 from the segmenter 22 in step S61 and receives the metadata supplied in step S32 from the metadata generator 23 in step S62.

In step S63, when the http request for requesting the metadata is transmitted from the client 12, the web server 26 receives the http request.

After that, in step S64, the web server 26 distributes the metadata requested by the http request from the client 12 by unicast to the client 12.

Also, in step S65, when the http request for requesting the content (the segment thereof) is transmitted from the client 12, the web server 26 receives the http request.

After that, in step S66, the web server 26 distributes the content (the segment thereof) requested by the http request from the client 12 by unicast to the client 12.

In the client 12 (FIG. 3), in step S71, the receiving unit 30 receives the metadata (the LCT packet thereof) distributed by the multicast server 25 by multicast in step S53.

Alternatively, in the client 12, the receiving unit 30 transmits the http request for requesting the metadata in step S72.

The http request transmitted by the client 12 in step S72 is received by the web server 26 in step S63 as described above. The metadata requested by the http request is distributed to the client 12 by unicast in step S64.

In step S73, the receiving unit 30 of the client 12 receives the metadata to which the unicast distribution is performed as described above.

In step S74, the receiving unit 30 of the client 12 receives the content (the LCT packet thereof), to which the multicast distribution is performed in step S54 by the multicast server 25, based on the metadata received in step S71 or S73.

Alternatively, in the client 12, the receiving unit 30 transmits in step S75 the http request for requesting the content based on the metadata received in step S71 or S73.

As described above, the web server 26 receives in step S65 the http request transmitted by the client 12 in step S75. The web server 26 distributes in step S66 the content requested by the http request to the client 12 by unicast.

The receiving unit 30 of the client 12 receives the content to which the unicast distribution has been performed as described above in step S76.

The reproducing unit 33 of the client 12 reproduces in step S77 the content received by the receiving unit 30 in step S74 or S76 based on the metadata (MPD).

<Description on Data Distributed Via Network 10>

Figure 5:
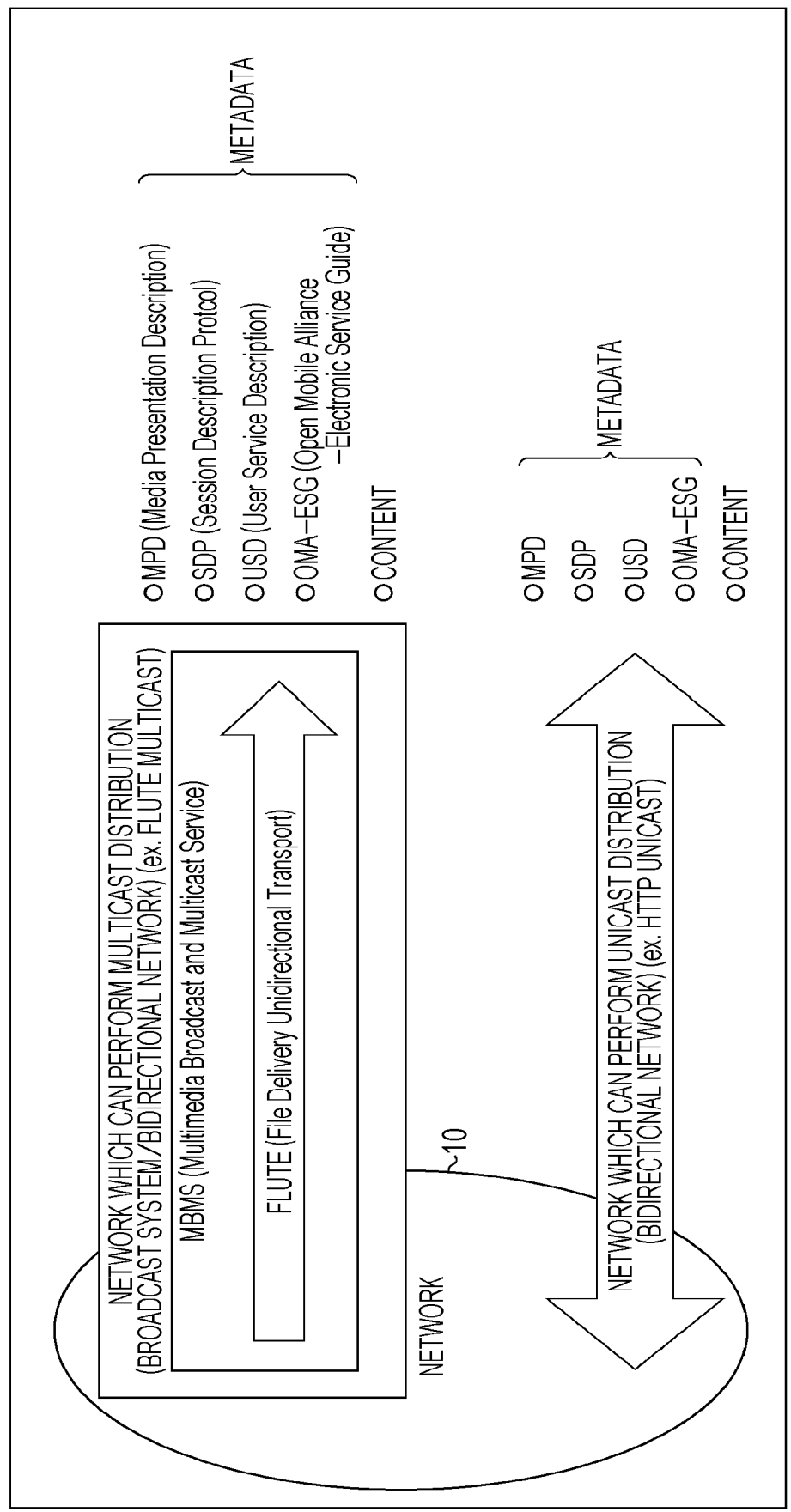
FIG. 5 is a diagram of exemplary data distributed via a network 10 in the content providing system.

FIG. 5 is a diagram of exemplary data distributed via the network 10 in the content providing system in FIG. 1.

In the content providing system, the metadata such as the MPD, the SDP, the USD, and the OMA-ESG, and the content (the segment or the portion thereof) are distributed to the client 12.

The multicast distribution and the unicast distribution can be performed to the metadata and the content.

The combination of the MPD, the SDP, and the USD and a combination of the MPD, the SDP, the USD, and the OMA-ESG are used as the metadata.

Figure 6:
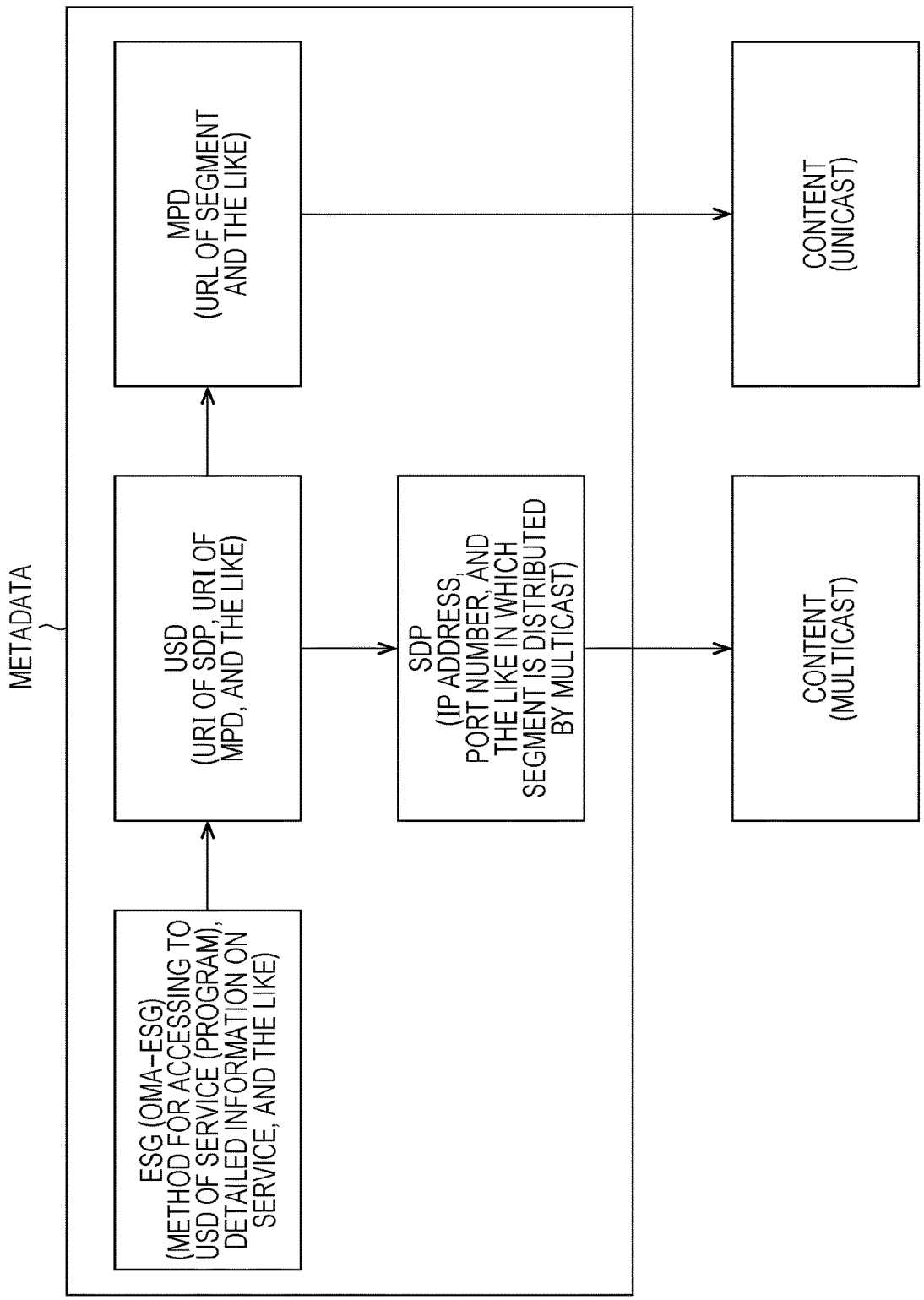
FIG. 6 is a diagram to describe the MPD, the SDP, the USD, and the OMA-ESG.

FIG. 6 is a diagram to describe the MPD, the SDP, the USD, and the OMA-ESG.

Now, when it is assumed that a certain program be a target program to which the attention is paid, detailed information on the target program, a method for accessing the USD of the target program, and the like are written in the OMA-ESG of the target program.

Therefore, when the client 12 obtains the OMA-ESG of the target program, the USD of the target program can be obtained by referring to the method for accessing the USD written in the OMA-ESG.

In the USD of the target program, a uniform resource identifier (URI) of the SDP of the target program, a URI of the MPD of the target program, and the like are written.

Therefore, when the client 12 obtains the USD of the target program, the SDP and the MPD of the target program can be obtained by referring to the URIs of the SDP and the MPD written in the USD.

In the SDP of the target program, a transport attribute such as an IP address and a port number in which the content of the target program is distributed by multicast is written.

Therefore, by obtaining the SDP of the target program, the content of the target program distributed by multicast can be received based on the IP address and the port number written in the SDP.

As described above, according to the combination of the USD and the SDP and the combination of the USD, the SDP, and the OMA-ESG, the client 12 can recognize that the content is distributed by multicast and can receive the content which is distributed by multicast.

In the MPD of the target program, the URL of the segment of the target program, information necessary for controlling the reproduction of the segment, and the like are written.

Therefore, by obtaining the MPD of the target program, the segment of the target program can be received by unicast based on the URL written in the MPD. Also, the segment of the target program can be reproduced based on the MPD of the target program.

That is, since the MPD includes information necessary for controlling the reproduction of the segment, the MPD is necessary for receiving the segment by unicast, and in addition, necessary for reproducing the segment.

<Structure of Segment>

Figure 7:
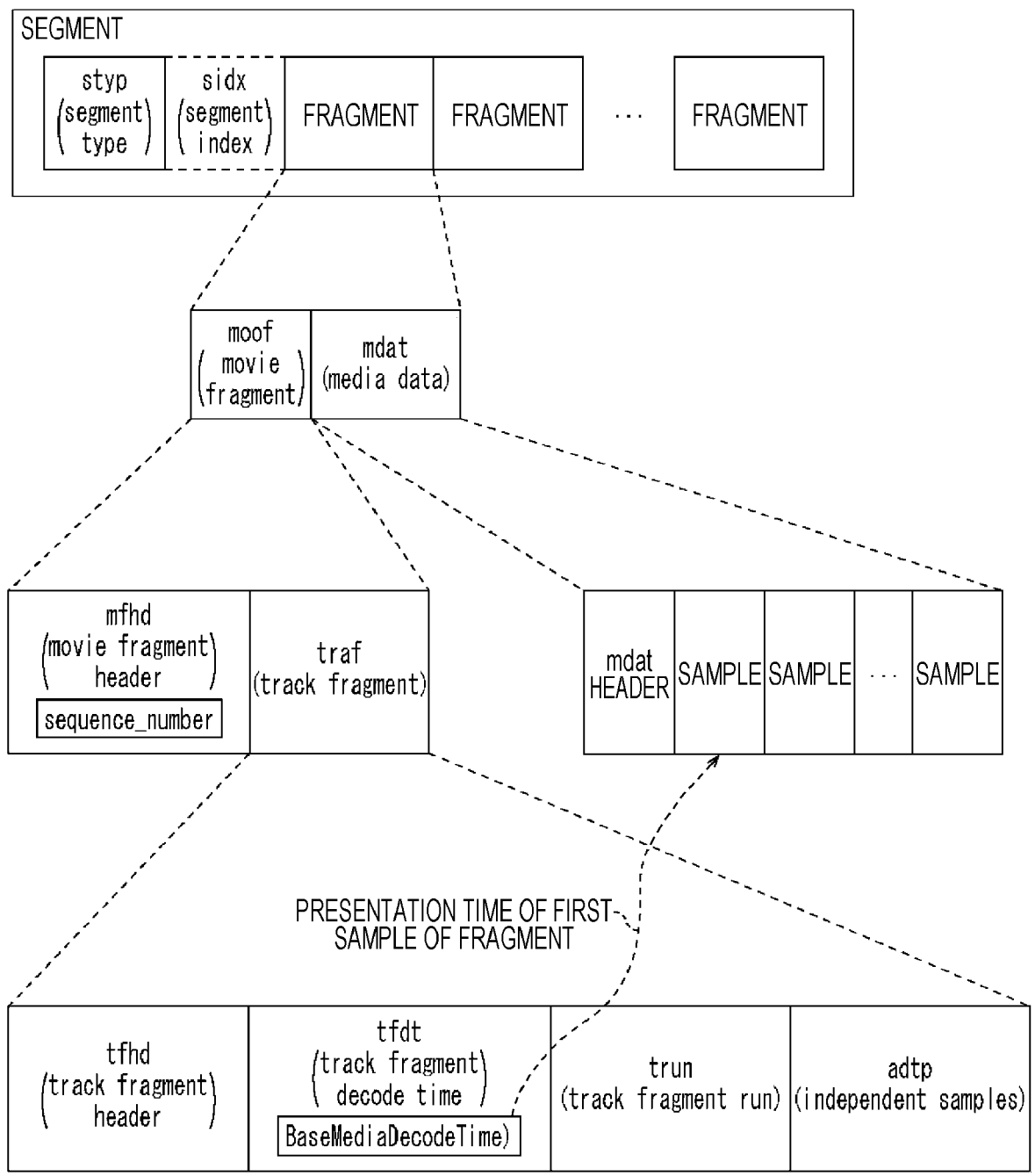
FIG. 7 is a diagram to describe a structure of a segment which is a file distribution unit of the DASH.

FIG. 7 is a diagram to describe a structure of the segment which is the file distribution unit of the DASH.

Here, the format of the content distributed by the DASH is not especially limited. However, in the present embodiment, for example, a fragmentedMP4 (file thereof) is employed as the format of the content distributed by the DASH.

The segment (Media Segment) includes styp (segment type) (box), necessary sidx (segment index) (box), and one or more fragments (MP4 fragment).

Here, when the styp is 'msdh', the segment does not include the sidx. When the styp is 'msix', the segment includes the sidx. The description on the sidx will be appropriately omitted below.

The fragment includes moof (movie fragment) (box) and mdat (media data) (box).

The mdat includes a mdat header and one or more samples. The sample is a minimum access unit in a case where media data (data of video and the like) in the MP4 file is accessed. Therefore, the media data in the MP4 file cannot be accessed in a unit smaller than the sample.

The moof includes mfhd (movie fragment header) (box) and traf (track fragment) (box).

A sequence number (sequence_number) is stored in the mfhd. The sequence_number represents an order of the fragment having the sequence_number.

The traf includes tfhd (track fragment header) (box), tfdt (track fragment decode time) (box), trun (track fragment run) (box), sdtp (independent samples) (box), and the like.

BaseMediaDecodeTime is stored in the tfdt. The BaseMediaDecodeTime represents a presentation time of a first sample from among the samples included in the fragment having the BaseMediaDecodeTime.

The trun stores information necessary for calculating the presentation time of each sample included in the fragment having the trun.

Figure 8:
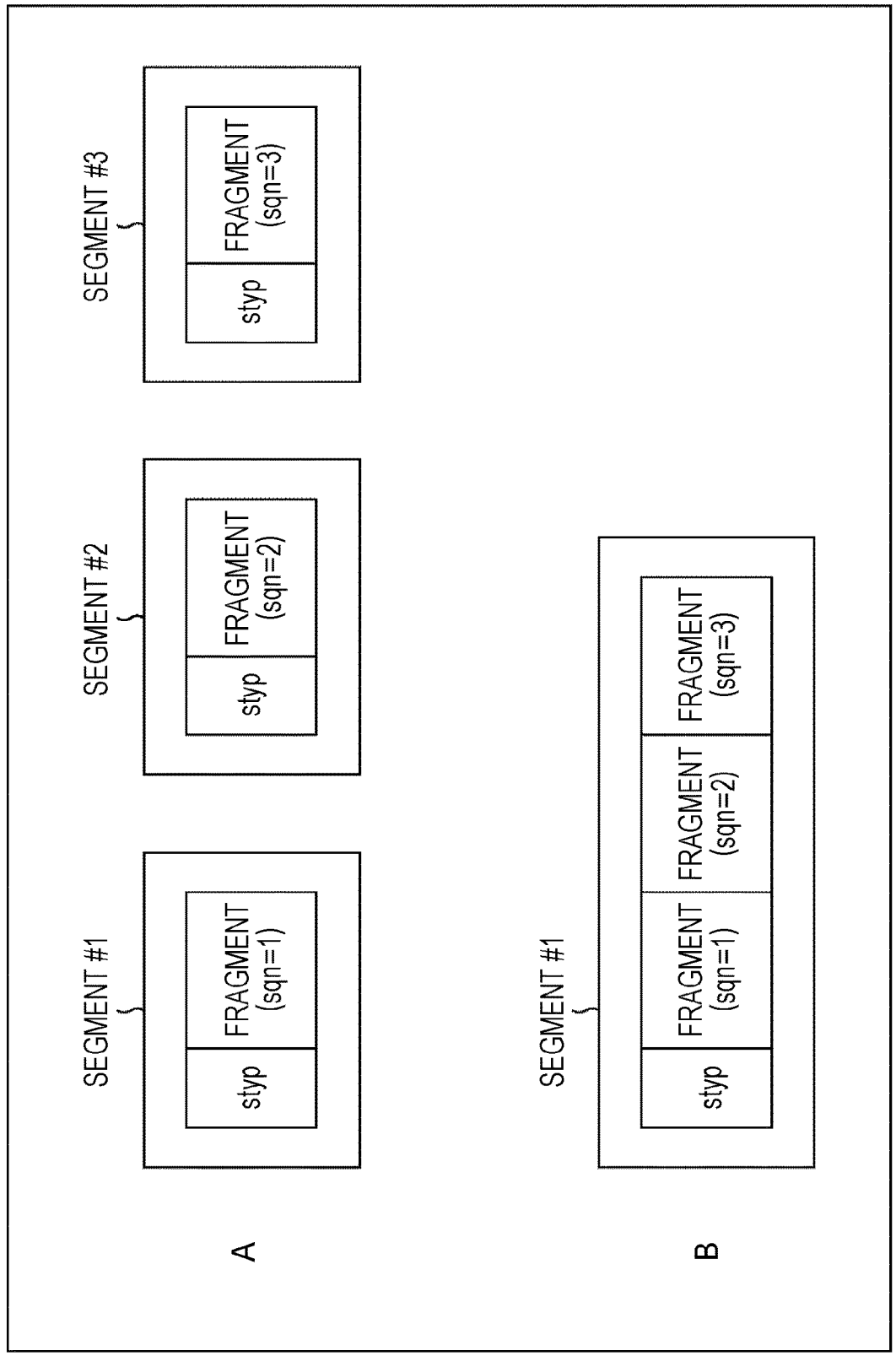
FIGS. 8A and 8B are diagrams of exemplary structures of segments respectively having single fragments and a segment having a plurality of fragments.

FIGS. 8A and 8B are diagrams of exemplary structures of a segment having a single fragment and a segment having a plurality of fragments.

FIG. 8A is a diagram of an exemplary structure of the segment having the single fragment.

In FIG. 8A, each of three continuous segments #1, #2, and #3 has a single fragment.

In this case, for example, when it is assumed that the sequence_number (described as "sqn" below) of the single fragment included in the first segment #1 be one, sqn of the single fragment included in the second segment #2 is two which is obtained by incrementing sqn=1 of the previous fragment by one. In addition, for example, sqn of the single fragment included in the third segment #3 is three which is obtained by incrementing sqn=2 of the previous fragment by one.

FIG. 8B is a diagram of an exemplary structure of the segment having the plurality of fragments.

In FIG. 8B, a segment #1 includes three fragments.

In this case, for example, when it is assumed that sqn of the first fragment of the segment #1 be one, sqn of the second fragment of the segment #1 is two which is obtained by incrementing sqn=1 of the previous fragment by one. In addition, for example, sqn of the third fragment of the segment #1 is three which is obtained by incrementing sqn=2 of the previous fragment by one.

To simplify the description, it is assumed below that the segment includes a single fragment as illustrated in FIG. 8A unless otherwise stated.

<Distribution of Content Having Segment as File Distribution Unit>

Figure 9:
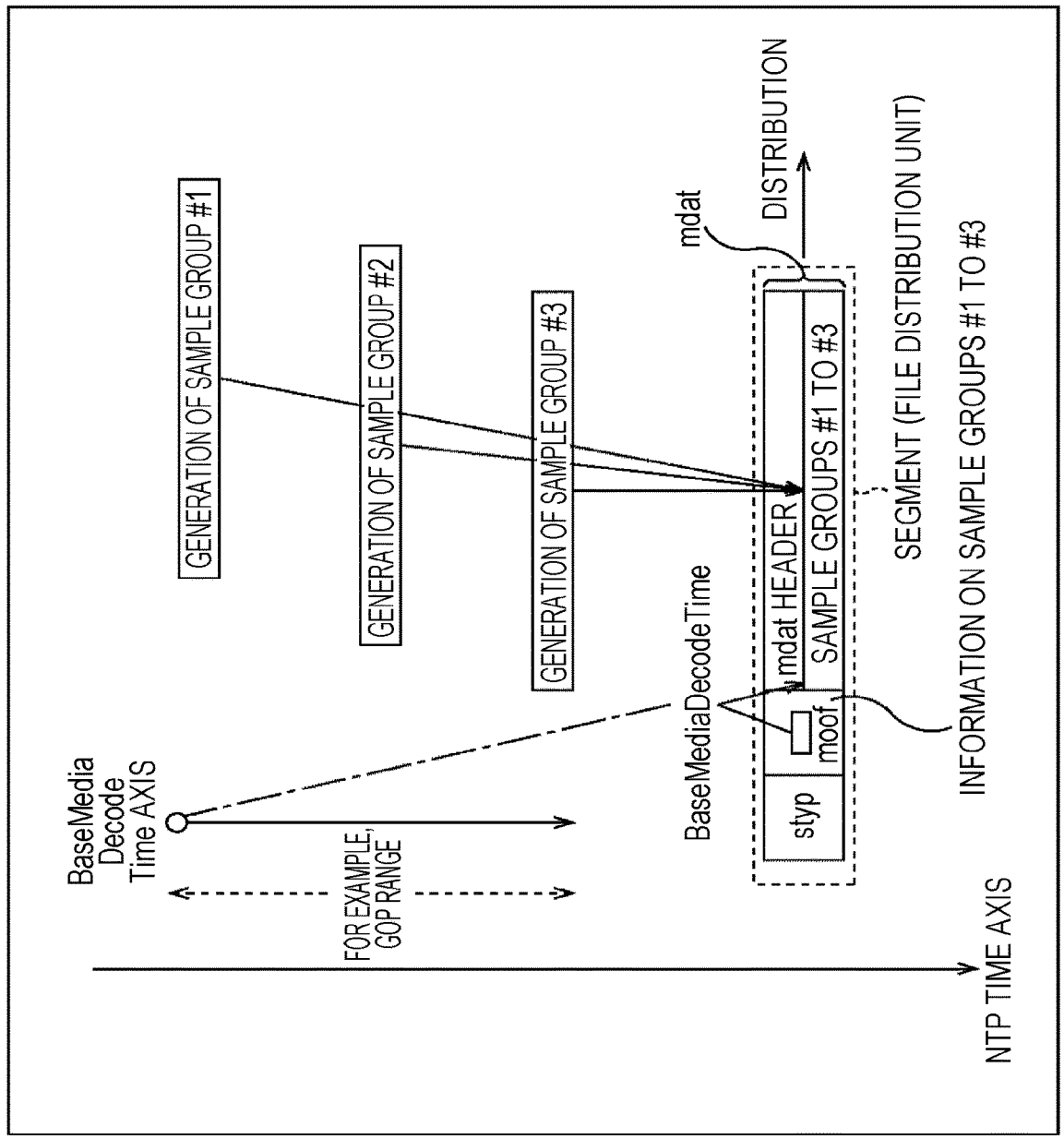
FIG. 9 is a diagram of an example of distribution of the content which has the segment as the file distribution unit in the DASH.

FIG. 9 is a diagram of an example of distribution of the content which has the segment as the file distribution unit in the DASH.

In FIG. 9, sample groups #1, #2, and #3, which respectively include one or more samples, are sequentially generated as a sample group included in the fragment. After the generation of the final sample group #3 of the fragment has been completed, the segmenter 22 of the distribution server 11 (FIG. 2) generates a fragment including the mdat in which the sample groups #1 to #3 are arranged and the moof of the sample groups #1 to #3. Also, the segment including the fragment is generated. After that, the FLUTE streamer 24 and the multicast server 25 distribute the segment.

Here, for example, the generation of the moofs of the sample groups #1 to #3 is performed in parallel to the generation of the sample groups #1 to #3.

Also, for example, a range of group of picture (GOP) which is a random accessible minimum unit can be employed as a range of the content to be the fragment (the sample groups #1 to #3 arranged as the mdat of the fragment).

However, the range of the content to be the fragment is not limited to the range of the GOP.

For example, as a time of the GOP, about 0.5 to two seconds is often employed. Therefore, when the range of the GOP is employed as the range of the content to be the fragment, the moof and the segment are generated after waiting at least the time of the GOP which is about 0.5 to two seconds. That is, at least the time of the GOP is necessary for generating the segment.

As a result, when the segment is distributed by multicast as the file distribution unit, it is necessary to wait at least the time of the GOP necessary for generating the segment in order to distribute the segment.

It is predicted that moving image distribution with high quality will be performed in the future. In this case, the data amount of the segment becomes very large. When the segment having the very large data amount is distributed after waiting the time of the GOP, a band of the network is compressed, and it is necessary to perform shaping.

Therefore, when the segment is assumed as the file distribution unit, the reception of the content by the client and the start of buffering are finally delayed.

The distribution server 11 distributes the data including a part of the fragment (referred to as a portion below) smaller than the segment by multicast as the file distribution unit so that the content (data thereof) is promptly distributed. Accordingly, the delay generated in the reception of the content by the client and the start of buffering is prevented.

<Distribution of Content Having Portion as File Distribution Unit>

Figure 10:
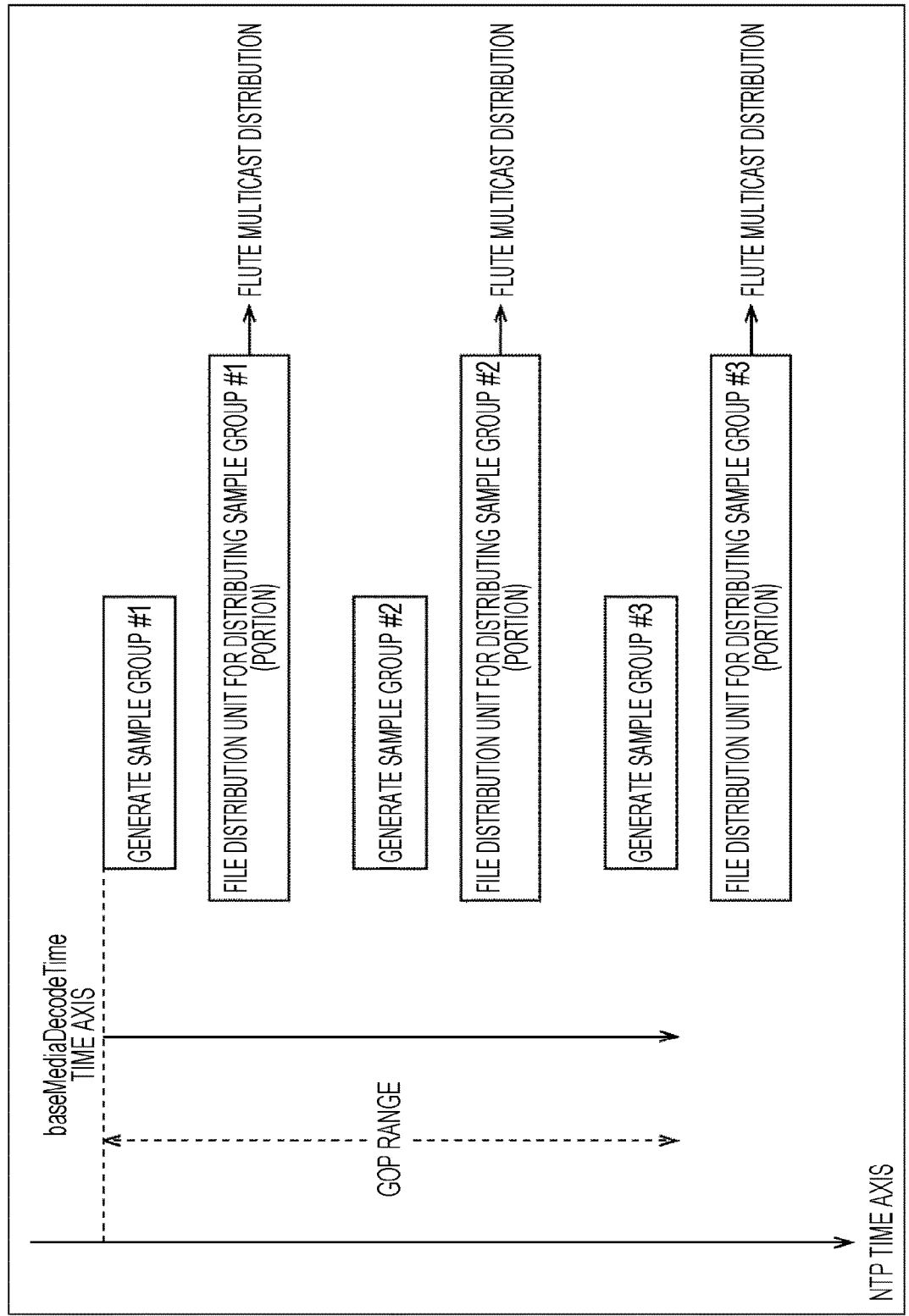
FIG. 10 is a diagram to describe an outline of distribution of content which has a portion as the file distribution unit in the distribution server 11.

FIG. 10 is a diagram to describe an outline of distribution of content which has a portion as the file distribution unit in the distribution server 11.

Similarly to the case in FIG. 9, the sample groups #1 to #3 are sequentially generated as the sample group included in the fragment in FIG. 10.

However, in FIG. 10, the segmenter 22 of the distribution server 11 (FIG. 2) generates the portion as the file distribution unit including the sample group #1 at the time when the sample group #1 is generated without waiting for the completion of the generation of the final sample group #3 of the fragment. The FLUTE streamer 24 and the multicast server 25 distribute the portion by multicast.

In addition, in FIG. 10, the segmenter 22 generates the portion as the file distribution unit including the sample group #2 at the time when the following sample group #2 is generated, and the FLUTE streamer 24 and the multicast server 25 distribute it by multicast.

When the segmenter 22 completes the generation of the final sample group #3 of the fragment, the portion as the file distribution unit including the sample group #3 is generated, and the FLUTE streamer 24 and the multicast server 25 distribute it by multicast.

As described above, the portion including the sample group which is a part of the fragment smaller than the segment (the sample groups #1 to #3 in FIG. 10) is generated, and the portion is distributed by multicast. Accordingly, the content can be promptly distributed, and the delay generated at the reception of the content by the client and at the start of buffering can be prevented.

Here, for example, when it is assumed that each of the sample groups #1 to #3 be data of one GOP, the sample group #1 corresponds to data of I picture which is encoded in the GOP first. The sample group #2 corresponds to data of P picture and B picture of one or more pictures which is encoded after the I picture of the GOP, and the sample group #3 corresponds to remaining data of P picture and B picture of the GOP.

<Portion>

FIGS. 11A to 11D are diagrams of an exemplary relation between the segment and the portion.

FIG. 11A is a diagram of an exemplary segment.

In FIG. 11A, a segment 50 includes a styp 51 and a (single) fragment 52.

The fragment 52 includes a moof 53 and a mdat 54.

As described in FIG. 7, the moof 53 stores a sequence number sqn of the fragment 52 and BaseMediaDecodeTime (referred to as bmdt below). BaseMediaDecodeTime represents a presentation time of a first sample of the mdat 54 of the fragment 52 (first sample of the sample group 56 in FIG. 11A).

Here, in FIG. 11A, the sequence number sqn of the fragment 52 is set to be one.

The mdat 54 stores a mdat header 55 and three sample groups 56 to 58 in this order. The sample groups 56 to 58 respectively correspond to, for example, the sample groups #1 to #3 in FIG. 10.

The first sample of the second sample group 57 of the three sample groups 56 to 58 stored in the mdat 54 is a n1th sample from the top of the first sample group 56.

Also, the first sample of the third sample group 58 of the three sample groups 56 to 58 is a n2 (>n1)th sample from the top of the first sample group 56.

Here, the order of the sample stored in the mdat from the first sample in the mdat is referred to as a sample number.

In FIG. 11A, a sample number of the first sample of the sample group 57 is n1, and a sample number of the first sample of the sample group 58 is n2.

Figure 11:
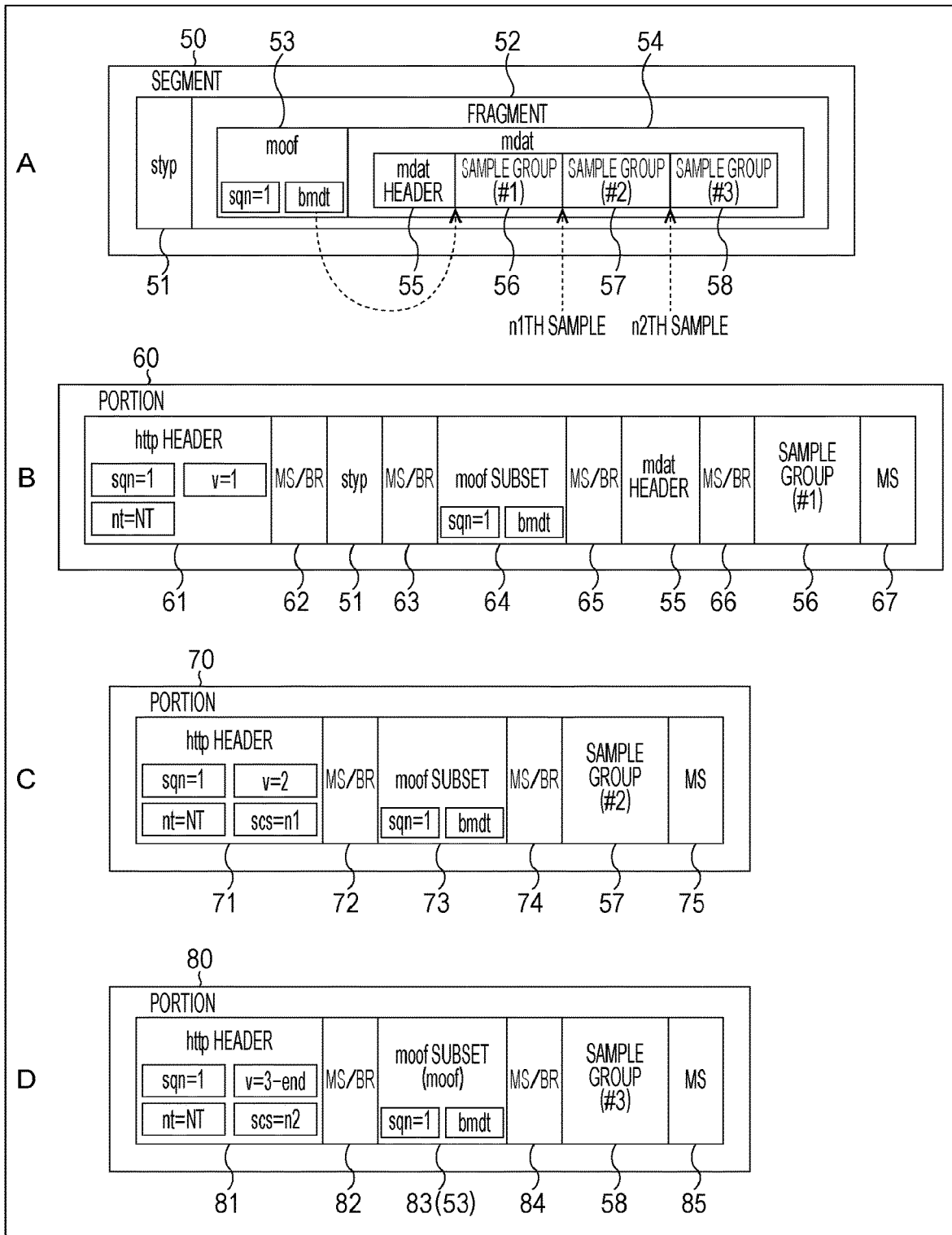
FIGS. 11A to 11D are diagrams of an exemplary relation between the segment and the portion.

FIGS. 11B to 11D are diagrams of an exemplary portion including a part of the fragment 52 included in the segment 50 in a case where the segment 50 in FIG. 11 A is generated.

That is, FIG. 11B is a diagram of an exemplary portion including the sample group 56 as a part of the fragment 52. Also, FIG. 11C is a diagram of an exemplary portion including the sample group 57 as other part of the fragment 52, and FIG. 11D is a diagram of an exemplary portion including the sample group 58 as still other part of the fragment 52.

In FIGS. 11A to 11D, the http response (the file thereof) is employed as the portion (the file thereof).

In FIG. 11B, a portion 60 is the http response including the first sample group 56 of the fragment 52. In the portion 60, an http header 61, a MS/BR 62, the styp 51, a moof subset 64, a MS/BR 65, the mdat header 55, a MS/BR 66, the sample group 56, and a MS 67 are arranged in this order.

The http header 61 is an http header indicating that a message body is a multipart message body. The http header 61 includes a sequence number sqn, a version v, and a NTP time nt.

The sequence number sqn of the http header 61 is set to be one which is same as the sequence number sqn stored in the moof 53 of the fragment 52 including the sample group 56 included in the portion 60 (as a part of the fragment 52).

The version v represents an order of the sample group as a part of the fragment included in the portion including the version v, in the fragment. The version v is an integer which is obtained by incrementing the same sequence number sqn (with sqn scope) by one, for example, while having the initial value of one.

A part of the fragment 52 included in the portion 60 including the version v of the http header 61 is the sample group 56, and the sample group 56 is the first sample group in the fragment 52. Therefore, the version v of the http header 61 is set to be one.

For example, the segment includes three fragments and the sequence numbers sqn of the three fragments are respectively one, two, and three as illustrated in FIG. 9. In this case, when 6 (=3×2) portions including the sample groups obtained by, for example, dividing the sample group of each fragment by two is generated, pairs (sqn, v) of the sequence numbers sqn and the versions v of the respective six portions are (1, 1), (1, 2), (2, 1), (2, 2), (3, 1), and (3, 2).

The NTP time nt of the http header 61 represents bmdt (BaseMediaDecodeTime) stored in the moof 53 of the fragment 52 of which a part (sample group 56) is included in the portion 60 including the NTP time nt, that is, a NTP time NT corresponding to bmdt representing the presentation time of the first sample of the fragment 52 (first sample of the sample group 56).

The MS/BR 62 represents a byte range of a multipart-separater and the styp 51 which is arranged immediately after the multipart-separater.

The MS/BR 63 represents a byte range of a multipart-separater and the moof subset 64 which is arranged immediately after the multipart-separater.

The moof subset 64 is a subset of the moof 53 which can be generated before generating the first sample group 56 arranged in the portion 60 of the three sample groups 56 to 58 of the fragment 52 and includes the sequence number sqn and bmdt stored in the moof 53.

The moof subset 64 which is the subset of the moof 53 and which can be generated before the sample group 56 is generated can reproduce the sample group 56.

The MS/BR 65 represents a byte range of a multipart-separater and the mdat header 55 which is arranged immediately after the multipart-separater.

The MS/BR 66 represents a byte range of a multipart-separater and the sample group 56 which is arranged immediately after the multipart-separater.

The MS 67 represents a multipart-separater.

In FIG. 11B, the portion 60 which includes the first sample group 56 of the fragment 52 includes the styp 51. However, the styp 51 (in addition, sidx which is not shown) can be distributed by being included in the http response other than the portion 60.

In FIG. 11C, a portion 70 is an http response including the second sample group 57 of the fragment 52. In the portion 70, an http header 71, a MS/BR 72, a moof subset 73, a MS/BR 74, the sample group 57, and a MS 75 are arranged in this order.

The http header 71 is an http header indicating that the message body is the multipart message body. The http header 71 includes the sequence number sqn, the version v, the NTP time nt, and a sample count start scs (SampleCountStart).

The sequence number sqn of the http header 71 is set to be one which is the same as the sequence number sqn stored in the moof 53 of the fragment 52 including the sample group 57 included in the portion 70 (as a part of the fragment 52).

The version v of the http header 71 is set to be two. That is, since the portion 70 includes the second sample group 57 of the sample groups 56 to 58 of the fragment 52, the version v of the http header 71 is set to be two.

The NTP time nt of the http header 71 represents a NTP time corresponding to bmdt stored in the moof 53 of the fragment 52 of which a part (sample group 57) is included in the portion 70 including the NTP time nt. The NTP time nt of the http header 71 is the same as the NTP time nt=NT of the http header 61.

The sample count start scs represents an order of the first sample of the sample group included in the portion including the sample count start scs, from the first sample in the fragment.

As described in FIG. 11A, the first sample of the sample group 57 included in the portion 70 is n1th sample from the top of the first sample group 56. Therefore, the sample count start scs of the http header 71 is set to be n1.

The MS/BR 72 represents a byte range of a multipart-separater and the moof subset 73 which is arranged immediately after the multipart-separater.

The moof subset 73 is a subset of the moof 53 which can be generated before generating the second sample group 57 arranged in the portion 70 of the three sample groups 56 to 58 of the fragment 52 and includes the sequence number sqn and bmdt stored in the moof 53.

In the moof subset 73, which is the subset of the moof 53 which can be generated before the generation of the sample group 57, information necessary for reproducing the sample group 57 is added to the moof subset 64 generated before the generation of the sample group 56. Therefore, according to the moof subset 73, the sample group 57 and the sample group 56 which is generated before the generation of the sample group 57 can be reproduced.

The MS/BR 74 represents a byte range of a multipart-separater and the sample group 57 which is arranged immediately after the multipart-separater.

The MS 75 represents a multipart-separater.

In FIG. 11D, a portion 80 is an http response including the third sample group 58 of the fragment 52. In the portion 80, an http header 81, a MS/BR 82, a moof subset 83, a MS/BR 84, the sample group 58, and a MS 85 are arranged in this order.

The http header 81 is an http header indicating that the message body is the multipart message body. The http header 81 includes the sequence number sqn, the version v, the NTP time nt, and the sample count start scs.

The sequence number sqn of the http header 81 is set to be one which is the same as the sequence number sqn stored in the moof 53 of the fragment 52 including the sample group 58 included in the portion 80 (as a part of the fragment 52).

The version v of the http header 81 is set to be three. That is, since the portion 80 includes the third sample group 58 of the sample groups 56 to 58 of the fragment 52, the version v of the http header 81 is set to be three.

In addition, since the sample group 58 included in the portion 80 is the final sample group of the fragment 52, that is, the final group of which the sequence number sqn is one, the version v of the http header 81 is set to be three which is an order of the sample group 58 in the fragment 52 and set to be "-end" as information indicating that this is the final sample group of the fragment.

Therefore, for example, the client 12 which receives the portion can recognize the order of the sample group included in the portion (as a part of the fragment) and whether the sample group is the final sample group of the fragment based on the version v.

The NTP time nt of the http header 81 represents the NTP time corresponding to bmdt stored in the moof 53 of the fragment 52 of which a part (sample group 58) is included in the portion 80 including the NTP time nt. The NTP time nt of the http header 81 is the same as the NTP time nt=NT of the http headers 61 and 71.

As described above, the sample count start scs represents an order of the first sample of the sample group included in the portion including the sample count start scs, from the first sample of the fragment.

Therefore, the sample count start scs of the http header 81 is set to be n2. That is, as described in FIG. 11A, the first sample of the sample group 58 included in the portion 80 is the n2th sample from the top of the first sample group 56. Therefore, the sample count start scs of the http header 81 is set to be n2.

The MS/BR 82 represents a byte range of a multipart-separater and the moot subset 83 which is arranged immediately after the multipart-separater.

The moot subset 83 is a subset of the moot 53 which can be generated before generating the third sample group 58 arranged in the portion 80 of the three sample groups 56 to 58 of the fragment 52 and includes the sequence number sqn and bmdt stored in the moof 53.

Here, since the moot subset 83 is the subset of the moot 53 which can be generated before generating the third sample group 58 arranged in the portion 80, that is, the final sample group 58 of the fragment 52, the moot subset 83 is equal to the moot 53.

As described above, the moot subset 83 that is the subset of the moof 53 which can be generated before generating the sample group 58 is equal to the moof 53. Therefore, according to the moot subset 83, the sample group 58, and in addition, the sample groups 56 and 57 which are generated before the sample group 58 is generated can be reproduced.

The MS/BR 84 represents a byte range of a multipart-separater and the sample group 58 which is arranged immediately after the multipart-separater.

The MS 85 represents a multipart-separater.

As described above, since the portion which is the http response includes the sequence number sqn and the version v in the http header, the client 12 (other apparatus) which has received the portion can perform the reproduction as recognizing the order of the sample group included in the portion in the segment based on the sequence number sqn and the version v and can perform reproduction as forming the segment as necessary.

Also, the portion includes the moof subset which is the information of the moof necessary for reproducing the sample group included in the portion. Therefore, at the time when the client 12 receives a single portion before the client 12 receives all the portions (sample group) forming the segment, when the sample group included in the single portion is a sample group which can be independently reproduced (for example, a sample group of I picture) or when the sample group is a sample group which can be reproduced by using the already received sample group, the reproduction of the sample group included in the received single portion can be started.

The version v can be included in the moof subset together with the sequence number sqn. However, when the version v is included in the moof subset together with the sequence number sqn, it is necessary to extend the definition of the existing moof to include the version v in the moof. When the version v is included in the http header, it is not necessary to extend the definition of the existing moof.

Also, in FIGS. 11A to 11D, the http headers 71 and 81 of the portions 70 and 80 respectively including the second and following sample groups 57 and 58 of the fragment 52 include the sample count start scs, and the http header 61 of the portion 60 including the first sample group 56 of the fragment 52 does not include the sample count start scs. However, the sample count start scs can also be included in the http header 61 of the portion 60 including the first sample group 56 of the fragment 52.

However, the order of the first sample of the first sample group of the fragment from the first sample of the fragment is constantly one and the fixed value. Therefore, as illustrated in FIG. 11B, the http header of the portion including the first sample group of the fragment (the http header of which the version v is one) can omit the sample count start scs, and accordingly, the size of the http header can be reduced.

Also, in the portion which is the http response, the http header can include the NTP time nt corresponding bmdt stored in the moof of the fragment (bmdt representing the presentation time of the first sample of the fragment). Therefore, when receiving the portion, the client 12 can reproduce the sample group included in the portion without the corresponding MPD.

That is, the content includes, for example, content necessary to control the timing of the reproduction on a time axis of the absolute time expressed by the NTP time such as a live broadcast program. In this case, regarding the sample of the content, it is necessary to calculate the NTP time as the absolute time in which each sample is mapped (displayed).

Here, a presentation time of the Nth sample of the fragment (PresentatioTime (CompositionTime) of Nth Sample) can be calculated based on the following formula.

PresentatioTime (CompositionTime) of Nth Sample=BaseMediaDecodeTime+Sum of SampleDuration of (N−1) Samples+CompositionTimeOffset of Nth Sample Sum of SampleDuration of (N−1) Samples and CompositionTimeOffset of Nth Sample can be obtained from information stored in the moof of the fragment (sampleCount, SampleDuration, and CompositionTimeOffset), and BaseMediaDecodeTime is stored in the moof as bmdt.

When the NTP time corresponding to BaseMediaDecodeTime used for calculating the presentation time of the sample is known, the absolute time of the sample can be obtained.

The NTP time corresponding to BaseMediaDecodeTime (BaseMediaDecodeTime=0) to be a start point is written in the MPD of the DASH. Therefore, when the acquisition of the MPD is secured, it is not necessary to include the NTP time nt corresponding to bmdt stored in the moof of the fragment in the http header.

However, the http header includes the NTP time nt corresponding to bmdt stored in the moof of the fragment (bmdt representing the presentation time of the first sample of the fragment). According to this, when receiving the portion, the client 12 calculates the NTP time as the absolute time of each sample of the sample group included in the portion without the corresponding MPD based on the NTP time nt included in the http header of the portion and can reproduce the sample according to the NTP time.

Also, in the portion which is the http response, the http header can include the sample count start scs representing the order of the first sample of the sample group included in the portion from the first sample of the fragment. Therefore, when a part of the portion of the plurality of portions included in the segment (the portions respectively including the sample groups included in the segment) lacks, the portion (the sample group included in the portion) following after the lacked portion can be reproduced.

That is, when it is ensured that the client 12 receives all of the plurality of portions included in the segment, the sample number which indicates the order of each sample of the portion from the first sample of the fragment can be recognized without the sample count start scs. The information necessary for reproducing the sample can be obtained from the moof subset based on the sample number, and the sample can be reproduced.

However, when a part of the portion of the plurality of portions included in the segment lacks, regarding the sample included in the portion following after the lacked portion, the sample number cannot be recognized without the sample count start scs, and it is difficult to reproduce the sample.

By including the sample count start scs in the http header of the portion, even when a part of the portion of the plurality of portions included in the segment lacks, regarding the sample included in the portion following after the lacked portion, the sample number can be recognized by the sample count start scs, and the sample can be reproduced.

Also, since the portion includes the moof subset which is the subset of the moot 53 and which can be generated before the sample group included in the portion is generated, the client 12 which has received the portion can start the reproduction of the sample group included in the received portion based in the moof subset included in the portion without waiting for the following portion.

In addition, for example, the http header of the portion can include a file delivery table (FDT) which is various attribute information distributed by the FLUTE which distributes the portion by multicast. In this case, the client 12 can provide the FDT included in the http header of the portion for receiving data to which FLUTE multicast distribution is performed.

FIG. 12 is a diagram of an exemplary description of the http response as the portion 60 in FIGS. 11A to 11D.

A description 100 is the http header 61, and "X-MoofSeqNumVersion" in a description 101 of the http header 61 and "X-NTPTimeStamp" in a description 102 are newly defined headers.

"X-MoofSeqNumVersion" in the description 101 is a header representing the sequence number sqn and the version v and includes a variable sqn representing a sequence number and a variable v representing a version. The variable sqn is set to be one which is the sequence number sqn of the fragment 52, and the variable v is set to be one which is an order of the sample group 56 included in the portion 60 in the fragment 52.

"X-NTPTimeStamp" in the description 102 is a header representing the NTP time nt (corresponding to BaseMediaDecodeTime). In FIG. 12, "X-NTPTimeStamp" is set to be 2890844526 as the NTP time NT corresponding to bmdt representing the presentation time of the first sample of the fragment 52 (first sample of the sample group 56).

The description 103 is the MS/BR 62, and "SEPARATER_STRING" in the description 103 represents the multipart-separater. Also, "Content-range: bytes 492-499/124567654" in the description 103 represents the byte range of the styp 51 immediately after that.

Here, the byte range "Content-range: bytes 492-499/124567654" in the description 103 indicates that the size of the fragment is 124567654 bytes and the size of the styp 51 immediately after that is 492 to 499 bytes of the 124567654 bytes.

The byte sequence of the styp 51 follows after the description 103.

A description 104 after the byte sequence of the styp 51 is the MS/BR 63, and "Content-range: bytes 500-991/124567654" in the description 104 represents the byte range of the moof subset 64 immediately after that.

Here, regarding the byte range of the moof subset, at the time of generating the portion including the first sample group of the fragment (the portion 60 in FIGS. 11A to 11D), the byte range of the moof (the moof 53 in FIGS. 11A to 11D) of the fragment is predicted. A predictive value of the byte range of the moof is employed as the byte range of the moof subset of each portion (the portions 60, 70, and 80 in FIGS. 11A to 11D) including in the sample group of the fragment. Therefore, byte ranges of the moof subset 64 of the portion 60, the moof subset 73 of the portion 70, and the moot subset 83 of the portion 80 are the same values (the predictive value of the byte range of the moot 53).

A byte sequence of the moot subset 64 follows after the description 104.

A description 105 after the byte sequence of the moof subset 64 is the MS/BR 65, and "Content-range: bytes 992-999/124567654" in the description 105 represents the byte range of the mdat header 55 immediately after that.

A byte sequence of the mdat header 55 follows after the description 105.

A description 106 after the byte sequence of the mdat header 55 is the MS/BR 66, and "Content-range: bytes 1000-4999/124567654" in the description 106 represents the byte range of the sample group 56 immediately after that.

A byte sequence of the sample group 56 follows after the description 106.

A description 107 of the byte sequence of the sample group 56 is the MS 67.

FIG. 13 is a diagram of an exemplary description of the http response as the portion 70 in FIGS. 11A to 11D.

A description 120 is the http header 71, and "X-MoofSeqNumVersion" in a description 121 of the http header 71, "X-NTPTimeStamp" in a description 122, and "X-SampleCountStart" in a description 123 are newly defined headers.

As described in FIG. 12, "X-MoofSeqNumVersion" in the description 121 is a header representing the sequence number sqn and the version v. The variable sqn representing the sequence number is set to be one which is the sequence number sqn of the fragment 52, and the variable v representing the version is set to be two which is an order of the sample group 57 included in the portion 70 in the fragment 52.

As described in FIG. 12, "X-NTPTimeStamp" in the description 122 is a header representing the NTP time nt, and the NTP time NT corresponding to bmdt representing the presentation time of the first sample of the fragment 52 is set to be 2890844526 which is the same as that in a case of FIGS. 11A to 11D.

"X-SampleCountStart" in the description 123 is a header representing the sample count start scs. In FIG. 13, "X-SampleCountStart" is set to be n1 which is the sample number of the first sample of the sample group 57 included in the fragment 70.

A description 124 is the MS/BR 72, and "Content-range: bytes 500-991/124567654" in the description 124 represents a byte range of the moot subset 73 immediately after that and is the same as the byte range of the moot subset 64 in the description 105 in FIG. 12 (predictive value of the byte range of the moot 53).

A byte sequence of the moot subset 73 follows after the description 124.

A description 125 after the byte sequence of the moot subset 73 is the MS/BR 74, and "Content-range: bytes 5000-7999/124567654" in the description 125 represents the byte range of the sample group 57 immediately after that.

A byte sequence of the sample group 57 follows after the description 125.

A description 126 of the byte sequence of the sample group 57 is the MS 75.

The portion 80 in FIGS. 11A to 11D is formed similarly to the portion 70 in FIG. 13.

<Distribution of Content in Portion Unit>

Figure 14:
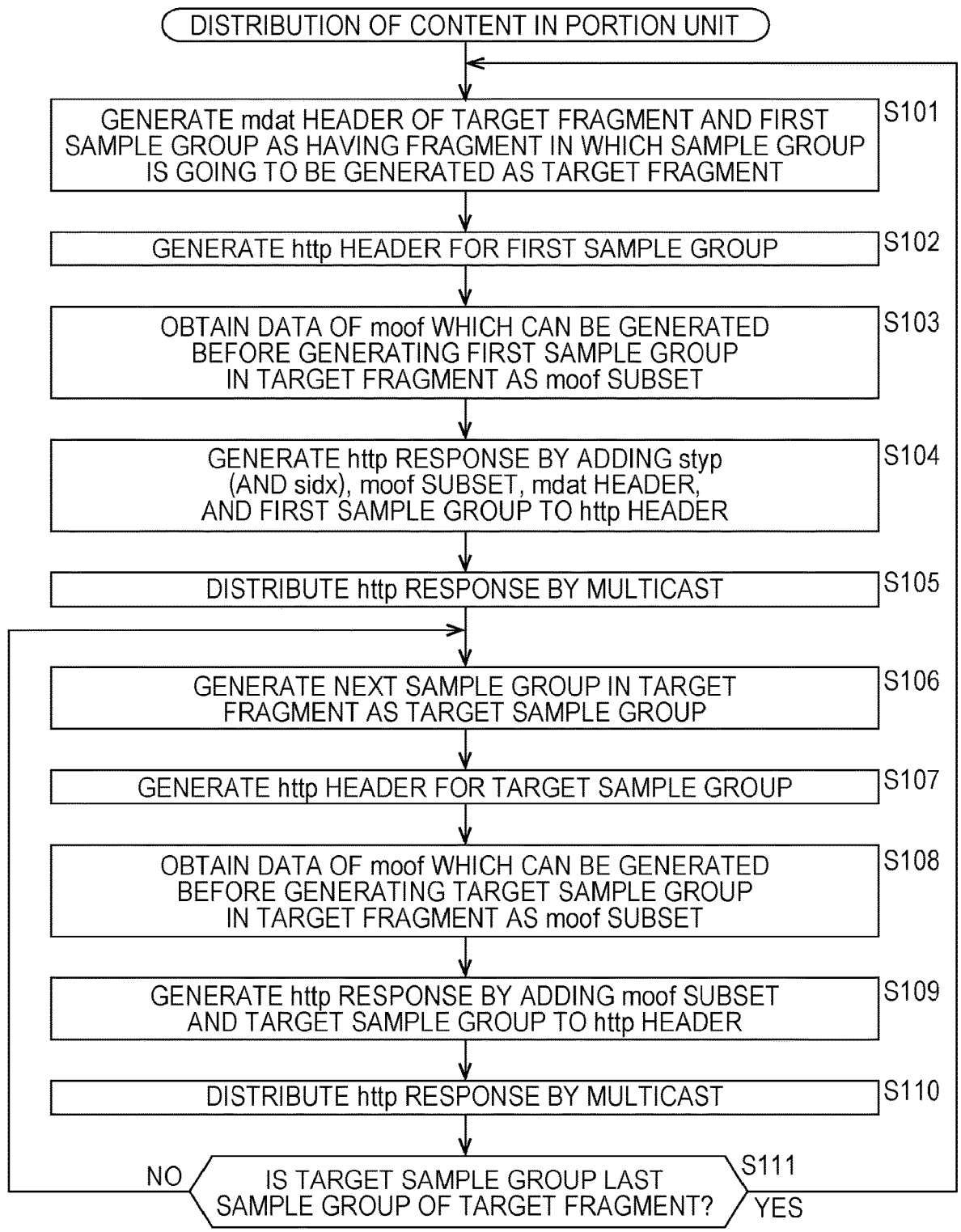
FIG. 14 is a flowchart to describe exemplary processing of distribution of content in a portion unit.

FIG. 14 is a flowchart to describe exemplary processing for receiving the content in a portion unit.

In step S101, the segmenter 22 of the distribution server 11 (FIG. 2) generates a mdat header of a target fragment and a first sample group as having the fragment (for example, the fragment 52 in FIGS. 11A to 11D) in which the sample group is going to be generated as the target fragment. Then, the procedure proceeds to step S102.

The segmenter 22 generates an http header for the first sample group (for example, the http header 61 in FIGS. 11A to 11D) in step S102, and the procedure proceeds to step S103.

That is, the segmenter 22 generates the http header as the http header for the first sample group. The http header includes a sequence number sqn which is the same as the sequence number stored in the moof of the target fragment, a version v which is one for representing the order of the first sample group in the target fragment, and a NTP time nt corresponding to bmdt stored in the moof of the target fragment.

Regarding the target fragment, the segmenter 22 obtains in step S103 a part of the moof necessary for reproducing the first sample as the moof subset for the first sample group which can be generated before generating the first sample group, and the procedure proceeds to step S104.

In step S104, the segmenter 22 generates the http response as the portion by adding the http header for the first sample group to styp (and necessary sidx) of the segment including the target fragment, the moot subset for the first sample group, the mdat header of the target fragment, and the first sample group and supplies it to the FLUTE streamer 24. Then, the procedure proceeds to step S105.

Here, when the segment including the target fragment includes a plurality of fragments and the target fragment is not the first fragment of the plurality of fragments, the http response generated in step S104 as the portion does not include styp (and necessary sidx).

In step S105, the FLUTE streamer 24 packetizes the http response as the portion from the segmenter 22 into a LCT packet, and the multicast server 25 performs the multicast distribution to the LCT packet. Then, the procedure proceeds to step S106.

Regarding the target fragment, the segmenter 22 generates the next sample group as a target sample group in step S106, and the procedure proceeds to step S107.

The segmenter 22 generates the http header for the target sample group (for example, the http headers 71 and 81 in FIGS. 11A to 11D) in step S107, and the procedure proceeds to step S108.

That is, the segmenter 22 generates the http header as the http header for the target sample group, and the http header includes the sequence number sqn which is the same as the sequence number stored in the moof of the target fragment, the version v which represents an order of the target sample group in the target fragment, the NTP time nt corresponding to bmdt stored in the moof of the target fragment, and the sample count start scs which represents a sample number of the first sample of the target sample group.

Regarding the target fragment, the segmenter 22 obtains in step S108 a part of the moof necessary for reproducing the target sample group which can be generated before generating the target sample group (and the sample group generated before generating the target sample group of the target fragment) as the moof subset for the target sample group. Then, the procedure proceeds to step S109.

In step S109, the segmenter 22 generates the http response as the portion by adding the http header for the target sample group to the moot subset for the target sample group and the target sample group and supplies it to the FLUTE streamer 24, and the procedure proceeds to step S110.

Similarly to step S105, in step S110, the FLUTE streamer 24 packetizes the http response as the portion from the segmenter 22 into a LCT packet, and the multicast server 25 performs the multicast distribution to the LCT packet. Then, the procedure proceeds to step S111.

The segmenter 22 determines in step S111 whether the target sample group is the final sample group of the target fragment.

When it has been determined in step S111 that the target sample group is not the final sample group of the target fragment, that is, when there is a next sample group of the target sample group in the target fragment, the procedure returns to step S106, and the similar processing is repeated as having the next sample group of the target sample group as a new target sample group.

Also, when it has been determined in step S111 that the target sample group is the final sample group of the target fragment, the procedure returns to step S101, and the similar processing is repeated after that as having the next fragment of the target fragment as a new target fragment, for example.

<Reception of Content in Portion Unit>

Figure 15:
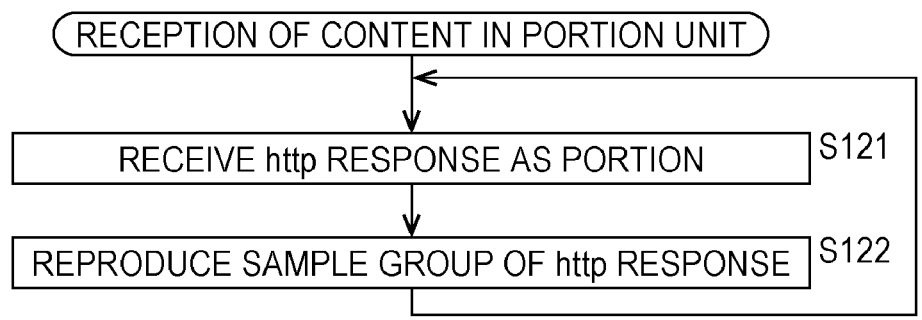
FIG. 15 is a flowchart to describe an example of processing for receiving the content in a portion unit.

FIG. 15 is a flowchart to describe exemplary processing for receiving the content in a portion unit.

In step S121, the receiving unit 31 of the client (FIG. 3) receives the http response as the portion after waiting for the multicast distribution of the http response as the portion, and the procedure proceeds to step S122.

In step S122, the reproducing unit 33 reproduces the sample group included in the http response as the portion received by the receiving unit 31 by using the moof subset included in the http response, the sequence number sqn included in the http header of the http response, the version v, the NTP time nt, and the sample count start scs as necessary.

The procedure returns from step S122 to step S121, and the similar processing is repeated after that.

As described above, since the distribution server 11 distributes the http response as the portion including the sample group at the time of generating the sample group which is a part of the fragment included in the segment without waiting for the generation of the segment, the distribution server 11 can promptly distribute the content.

As a result, the delay in the reception of the content by the client 12 and the start of buffering can be prevented.

<LCT Packet>

Figure 16:
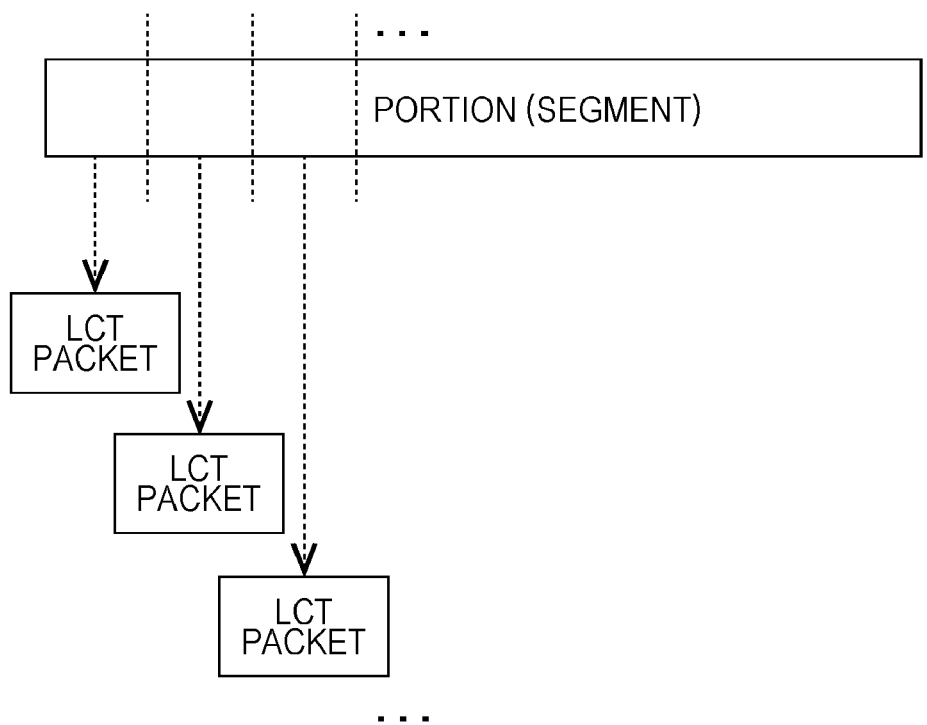
FIG. 16 is a diagram to describe multicast distribution of the portion (and the segment) by a LCT packet.

FIG. 16 is a diagram to describe multicast distribution of the portion (and the segment) by the LCT packet.

The FLUTE streamer 24 packetizes the portion (and the segment) into the LCT packet, and the multicast server 25 performs the multicast distribution to the LCT packet.

The FLUTE streamer 24 packetizes the portion into the LCT packet, for example, by dividing the portion into small pieces with a predetermined size and storing each small pieces to the LCT packet as illustrated in FIG. 16.

Figure 17:
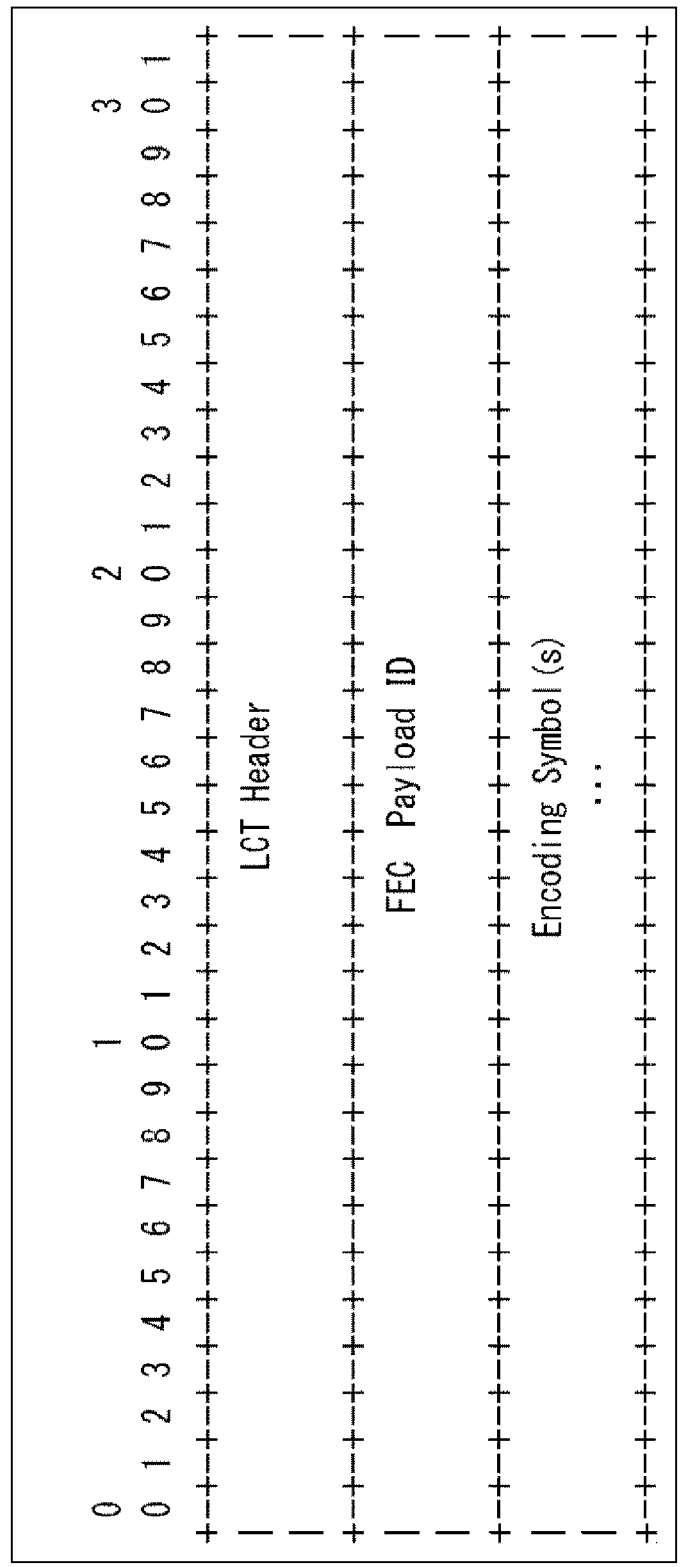
FIG. 17 is a diagram of a format of the LCT packet.

FIG. 17 is a diagram of a format of the LCT packet.

The LCT packet includes an LCT header (LCT Header), a FEC Payload ID, and an Encoding Symbol (s) arranged in this order.

The small pieces of the portion are stored in the LCT packet as the Encoding Symbol.

Figure 18:
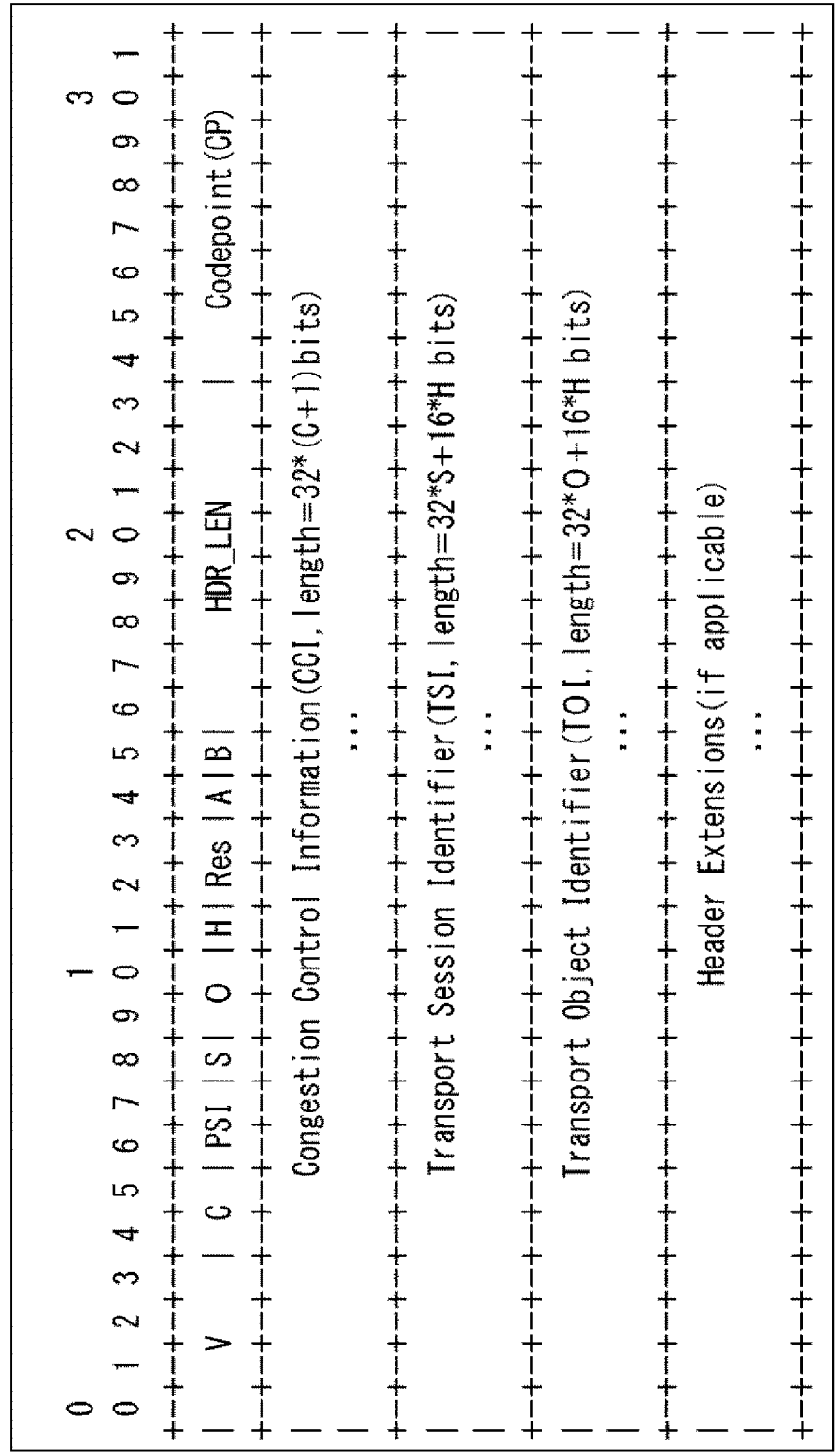
FIG. 18 is a diagram of a format of a LCT header.

FIG. 18 is a diagram of a format of the LCT header.

The LCT header includes a transport session identifier (TSI), a transport object identifier (TOI), and a necessary extension header (Header Extensions).

The TSI is an identifier for identifying a session of the LCT packet. For example, the TSIs of the LCT packet which are respectively obtained by packetizing the portions 60, 70, and 80 including the sample groups 56, 57, and 58 to be originally distributed in a single segment 50 (FIGS. 11A to 11D) are set to be the same values.

The TOI is an identifier for identifying an object in which the data is stored in the Encoding Symbol of the LCT packet. For example, the TOIs of the LCT packets in which the small pieces divided from the portion 60 are stored in the Encoding Symbol are set to be the same values.

However, for example, regarding the LCT packet in which the small pieces obtained by dividing the portion 60 are stored in the Encoding Symbol and the LCT packet in which the small pieces obtained by dividing the portion 70 are stored in the Encoding Symbol, the object of the portion 60 in which the data (small piece) is stored in the Encoding Symbol is different from that of the portion 70. Therefore, the LCT packet in which the small pieces obtained by dividing the portion 60 are stored in the Encoding Symbol and the LCT packet in which the small pieces obtained by dividing the portion 70 are stored in the Encoding Symbol have different TOIs from each other.

By receiving the LCT packets having the same TOIs, the client 12 can reconstruct the original portion by collecting the small pieces of the portions stored in the LCT packets.

Figure 19:
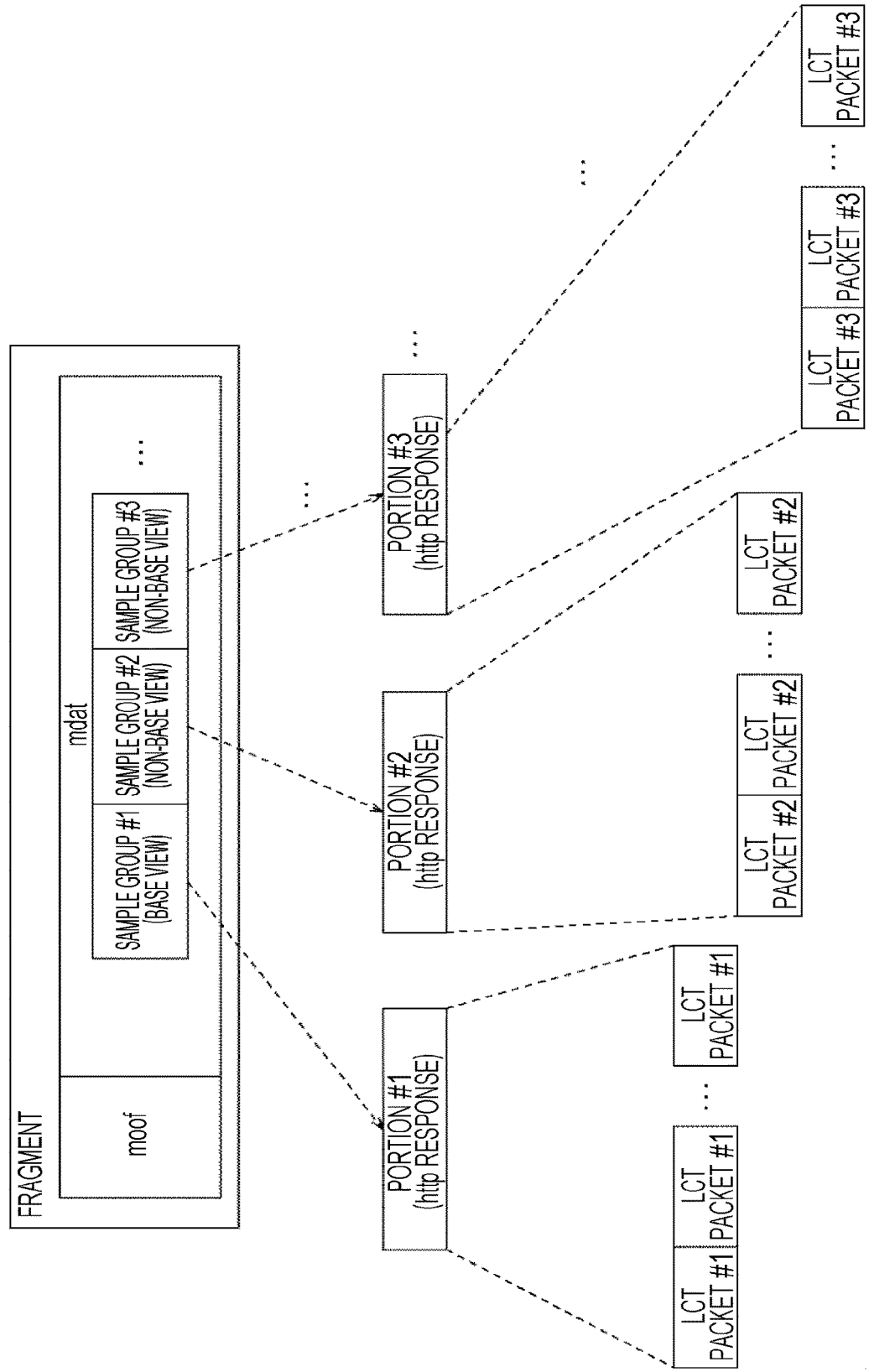
FIG. 19 is a diagram of exemplary distribution of the content in a portion unit.

FIG. 19 is a diagram of exemplary distribution of the content in a portion unit.

In FIG. 19, a certain fragment includes sample groups #1, #2, #3, . . . .

The sample group #1 is, for example, a video of a base view which does not refer to other view (a view of a base layer), and the sample groups #2, #3, . . . are videos of non-base views which may refer to the other view such as the base view (a view of an enhanced layer).

In the distribution of the content in a portion unit, the distribution server 11 generates a portion #i including a sample group #i (i=1, 2, 3 . . . ) The portion #i is divided into small pieces, and the small pieces of the portion #i are stored in a LCT packet #i and are distributed.

The TOIs of the LCT packets #i for storing the small pieces of the portion #i are the same values. Therefore, the client 12 can reconstruct the original portion #i by receiving the LCT packets and collecting the small pieces of the portions #i stored in the LCT packets having the same TOIs from among the received LCT packets.

Here, as described above, in FIG. 19, the sample group #1 included in the portion #1 is the video of the base view, and the sample groups #2, #3, . . . are the videos of the non-base views.

As described above, when the sample group included in the portion is data (processing unit) which can be classified based on a certain criterion such as the video of the base view and the video of the non-base view, the packet filtering for selecting the LCT packet in a portion (sample group included therein) unit can be performed.

That is, for example, when a sufficient resource (including a resource of the client 12 for finally receiving the LCT packet) is hard to be allocated to the distribution of the LCT packet due to the change in a network environment where the LCT packet is distributed, a router on a distribution route of the LCT packet (for example, a FLUTE multicast router) and a network stack (a block for perform processing to the LCT packet) of the client 12 can select minimum LCT packets or the LCT packet with high priority for the processing and can perform the processing (processing such as forwarding and stack) to it.

Especially, for example, for the distribution of the content by using the portable network in which the network environment is greatly fluctuated, the technique of the packet filtering for selecting minimum LCT packets and the LCT packet with high priority for the processing and performing processing to it as described above is highly required.

As a method for performing the packet filtering for selecting the LCT packet in a portion unit, there is a method in which the http header as the portion includes the attribute information of the sample group (for example, FDT) indicating that the sample group included in the portion is, for example, the video of the base view and the video of the non-base view and the LCT packet for storing the portion (small piece thereof) including the sample group is selected based on the attribute information of the sample group.

However, when the http header as the portion includes the attribute information of the sample group included in the portion, it is necessary to reconstruct the original portion from the LCT packet to recognize the attribute information of the sample group every time when the packet filtering is performed. It is difficult to efficiently perform the packet filtering.

In the distribution server 11, the FLUTE streamer 24 generates the LCT packet which has the LCT header including the priority parameter representing the priority of the processing of the LCT packet, and the multicast server 25 distributes the LCT packet which has the LCT header including the priority parameter by multicast. Accordingly, the efficient packet filtering can be performed, and according to this, necessary LCT packet can be promptly distributed and processed.

<Priority Parameter>

According to the present technique, the LCT header includes a priority parameter by extending the extension header of the LCT header so as to store the priority parameter.

Figure 20:
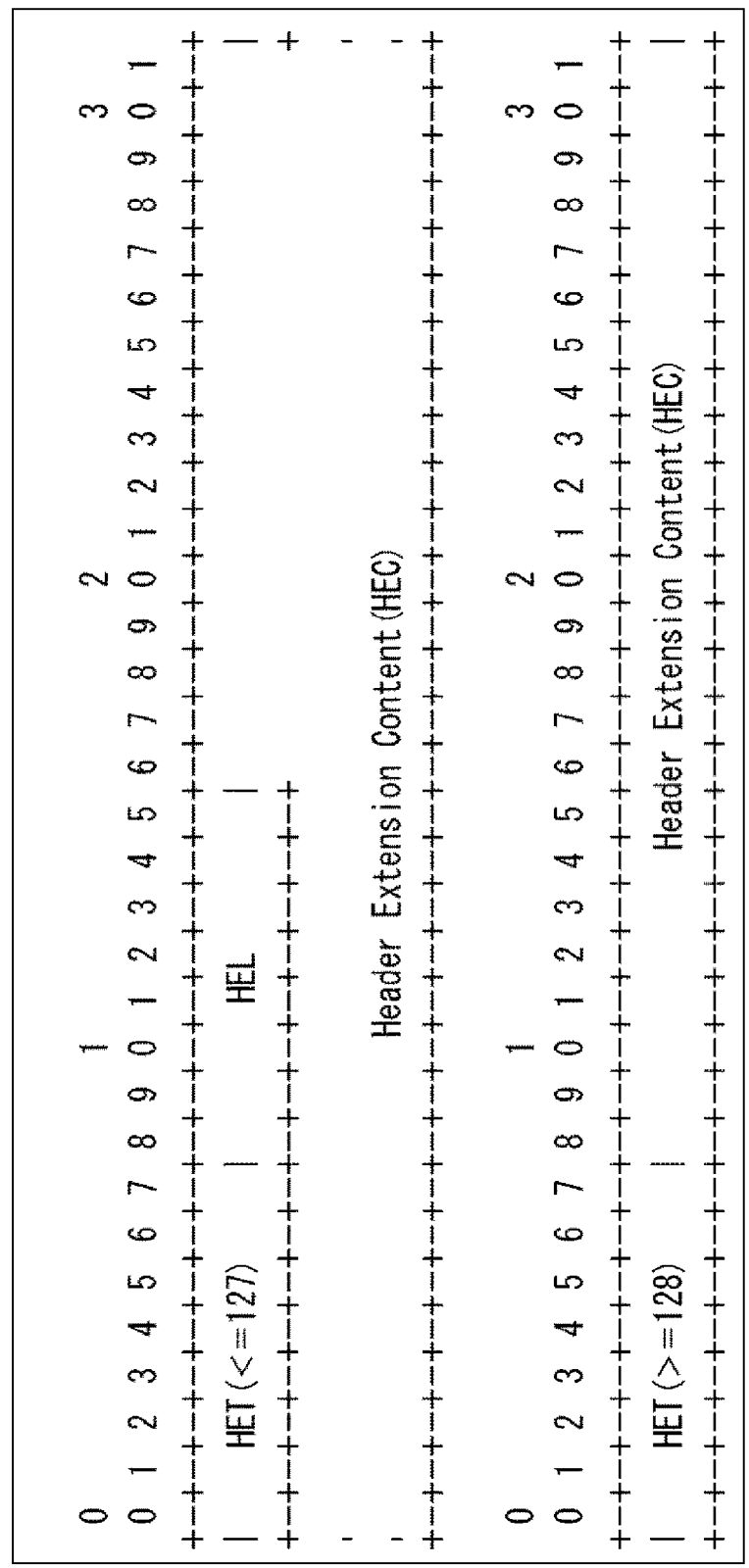
FIG. 20 is a diagram of a format of an extension header (Header Extensions) of the LCT header.

FIG. 20 is a diagram of a format of the extension header (Header Extensions) of the LCT header in FIG. 18.

Top eight bits of the extension header stores a header extension type (HET) representing a kind of the extension header (a kind of actual data stored in the extension header as the HEC).

When an eight-bit HET is equal to or smaller than 127, an eight-bit header extension length (HEL) is stored following after the HET. The HEL is set to be a value N which represents the length of the extension header 32×N bits.

A header extension content (HEC) having 32×N−8−8 bit variable length is stored following after the HEL. The HEC is actual data of the extension header.

On the other hand, when the eight-bit HET is equal to or larger than 128, a 32−8 bit HEC is stored following after the HET.

The HET has been already defined to several values. However, in the present embodiment, a new extension header for storing the priority parameter is defined by employing values which have not been defined as the HET.

FIG. 21 is a diagram of an exemplary definition of a new extension header for storing the priority parameter.

The new extension header includes the eight-bit HET, an eight-bit HEL, an eight-bit Filtering SchemeURI, an eight-bit Filtering Parameter Length, and a 8×FPLN bits Filtering Parameter arranged in this order.

In the HET of the new extension header, the extension header is set to be, for example, 120 which is a value indicating that the priority parameter is stored. In this case, the HET is equal to or less than 127, as illustrated in FIG. 20, the HET is arranged after the HET.

The HEL is set to be an integer value HELN of zero to 255. As the integer value HELN, a value having 32×HELN to be the length of the extension header is employed.

The Filtering Scheme URI is a scheme identifier (SchemeURI) for defining the Filtering Parameter.

The Filtering Parameter Length is set to be an integer value FPLN of zero to 255. As the integer value FPLN, a value having 32×FPLN to be the length of the Filtering Parameter is employed.

The Filtering Parameter is a priority parameter, and the definition (structure) of the Filtering Parameter is specified by Filtering Scheme URI.

FIG. 22 is a diagram of an exemplary definition of the priority parameter (Filtering Parameter).

For example, the Filtering Scheme URI=1000 represents the definition in FIG. 22.

In FIG. 22, the priority parameter (Filtering Parameter) is 64 bits and includes an eight-bit Track Reference Index, an eight-bit Priority, an eight-bit Dependency Counter, an eight-bit MVC Filter Length, and a 32-bit MVC Filter arranged in this order.

The Track Reference Index is set to be a value for identifying a track (track of a MP4 file) to which the sample group as a part of the fragment stored in the LCT packet (a sample group included in the portion in which the small pieces are stored in the LCT packet) of the integer values of zero to 255.

According to the Track Reference Index as the priority parameter, for example, the packet filtering for selecting the LCT packet in which the small pieces of the portion including the sample group to which a predetermined track belongs are stored with high priority and performing processing to it can be performed.

The Priority is set for each LCT packet having the same TOI. An index for representing the priority of the processing of the LCT packet of the TOI of each value is set to the Priority.

The index set to the Priority is an integer value of zero to 255 which ranks the priority of the processing of the LCT packet. For example, when the value gets larger, the priority gets lower.

According to the Priority as the priority parameter, for example, the packet filtering for selecting the LCT packet of the TOI, to which the Priority of equal to or less than a predetermined value is set, with high priority and performing processing to it can be performed.

The Dependency Counter is set to be a number K of the following LCT packets having the influence from the LCT packet including the Dependency Counter. When the Dependency Counter=K, the processing of the K LCT packets following after the LCT packet having the Dependency Counter=K depends on the processing of the LCT packet having the Dependency Counter=K.

According to the Dependency Counter as the priority parameter, for example, the packet filtering for selecting the LCT packet having the Dependency Counter of one or more, that is, the LCT packet having an influence on the following one or more LCT packets with high priority and performing processing to it can be performed.

The MVC Filter Length is set to be a Boolean value. When the MVC Filter Length is true, this indicates that the following MVC Filter exists.

The MVC Filter is information for performing the filtering to select the data of the multiview video coding (MVC) when the sample group included in the portion in which the small pieces are stored in the LCT packet is data of the MVC.

As the MVC Filter, for example, one of or two or more of PRID (priority_id), TID (tempral_id), and VID (View_id) which are defined as the header of a network abstraction layer (NAL) unit of the MVC stored in a RTP packet can be employed.

FIG. 23 is a diagram of an exemplary definition of the MVC filter.

A 32-bit MVC Filter includes a six-bit priority_id (PRID), a three-bit temporal_id (TID), a ten-bit view_id (VID), and a 13-bit Reserved arranged in this order.

The PRID, the TID, the VID, and the Reserved are defined as follows.

PRID: 6 bits priority_id. This flag specifies a priority identifier for the NAL unit. A lower value of PRID indicates a higher priority.

TID: 3 bits temporal_id. This component specifies the temporal layer (or frame rate) hierarchy. Informally put, a temporal layer consisting of view component with a less temporal_id corresponds to a lower frame rate.

A given temporal layer typically depends on the lower temporal layers (i.e. the temporal layers with less temporal_id values) but never depends on any higher temporal layer (i.e. a temporal layers with higher temporal_id value).

VID: 10 bits view_id. This component specifies the view identifier of the view the NAL unit belongs to.

Reserved: 13 bits (Reservation Bit for Extension in Future)

The PID represents a priority of a NAL unit (the NAL unit in a case where the sample group included in the portion in which the small pieces are stored in the LCT packet is the NAL unit). When the PID is smaller, the priority of the NAL unit is higher.

The TID represents a temporal layer (or frame rate) of the video (the video in a case where the sample group included in the portion in which the small pieces are stored in the LCT packet is the video (data thereof)). When the TID of the layer is smaller, the frame rate is lower. A layer may depend on a lower layer having a smaller TID than the layer. However, the layer does not depend on a higher layer having the larger TID.

The VID represents a view to which the NAL unit belongs.

The Reserved is a reservation bit for the future.

According to the above MVC Filter, for example, when the LCT packet includes the NAL unit (a part of) as the video, the packet filtering for selecting the LCT packet including the NAL unit with high priority based on the PID with high priority and performing processing to it can be performed.

Also, for example, the packet filtering for selecting the LCT packet including the video of which the temporal layer is equal to or less than a predetermined layer (the NAL unit thereof), that is, the video having the frame rate as a temporal resolution which is equal to or less than a predetermined value with high priority and performing processing to it can be performed based on the TID.

In addition, for example, the packet filtering for selecting the LCT packet including the video of a predetermined view (the NAL unit thereof) with high priority and performing processing to it can be performed based on the VID.

In addition, various information can be employed as the priority parameter.

That is, for example, when the LCT packet includes either video of a moving image and a still image, information indicating that the video is the moving image or the still image can be employed as the priority parameter. In this case, the packet filtering for selecting the LCT packet including the video of the moving image or the still image with high priority and performing processing to it can be performed.

Also, for example, when the LCT packet includes the video of either layer of the base layer which does not refer to the other layer and one or more non-base layers which may refer to the other layer, the information indicating the layer of the video can be employed as the priority parameter. In this case, for example, the packet filtering for selecting the LCT packet including the video of the base layer with high priority and performing processing to it can be performed.

In addition, for example, when the LCT packet includes the video of any views of a plurality of views, information indicating the view of the video can be employed as the priority parameter. In this case, for example, the packet filtering for selecting the LCT packet of the video of a view desired by the user (for example, video of a view imaged from a backstop side of videos of a plurality of views imaged from a plurality of positions such as a first base side, a third base side, and the backstop side in a in a baseball broadcast) with high priority and performing processing to it can be performed.

Also, for example, when the LCT packet includes a video of any resolutions of a plurality of resolutions, information indicating the resolution can be employed as the priority parameter. In this case, for example, the packet filtering for selecting the LCT packet including the video having a predetermined resolution (equal to or less than that) with high priority and performing processing to it can be performed. As the information indicating the resolution as the priority parameter, one of or both of the temporal resolution and a spatial resolution can be employed.

The packet filtering is performed based on a kind of the priority parameter, and in addition, the packet filtering can be performed based on a plurality of kinds of priority parameters.

That is, for example, in the packet filtering, the LCT packet including the video with the predetermined view and including the predetermined resolution can be selected with high priority and the processing can be performed to it based on the information indicating, for example, the view of the video and the information indicating the resolution as the priority parameter.

<Processing for Distributing LCT Packet Having Priority Parameter>

Figure 24:
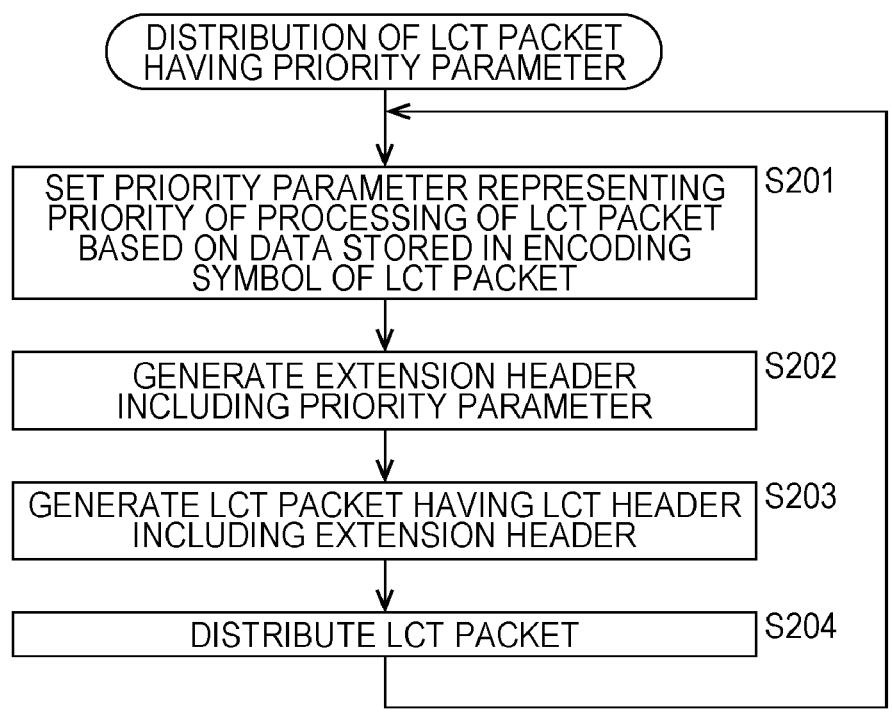
FIG. 24 is a flowchart to describe an example of processing for distributing the LCT packet having the priority parameter.

FIG. 24 is a flowchart to describe exemplary processing for distributing the LCT packet having the priority parameter.

In step S201, the FLUTE streamer 24 (FIG. 2) of the distribution server 11 sets the priority parameter based on data (the small piece of the portion supplied from the segmenter 22) to be stored in an encoding symbol (Encoding Symbol) (FIG. 17) of the LCT packet and an operation by an operator of the distribution server 11, and the procedure proceeds to step S202.

In step S202, the FLUTE streamer 24 generates the extension header (FIG. 21) (FIG. 22) including the priority parameter set in step S201, and the procedure proceeds to step S203.

In step S203, the FLUTE streamer 24 includes the LCT header (FIG. 18) including the extension header generated in step S202, generates the LCT packet (FIG. 17) in which the small piece of the portion supplied from the segmenter 22 is arranged to the encoding symbol, and supplies it to the multicast server 25. Then, the procedure proceeds to step S204.

The multicast server 25 distributes the LCT packet from the FLUTE streamer 24 by multicast in step S204, and the procedure returns to step S201. After that, similar processing is repeated.

<Processing of Packet Filtering>

Figure 25:
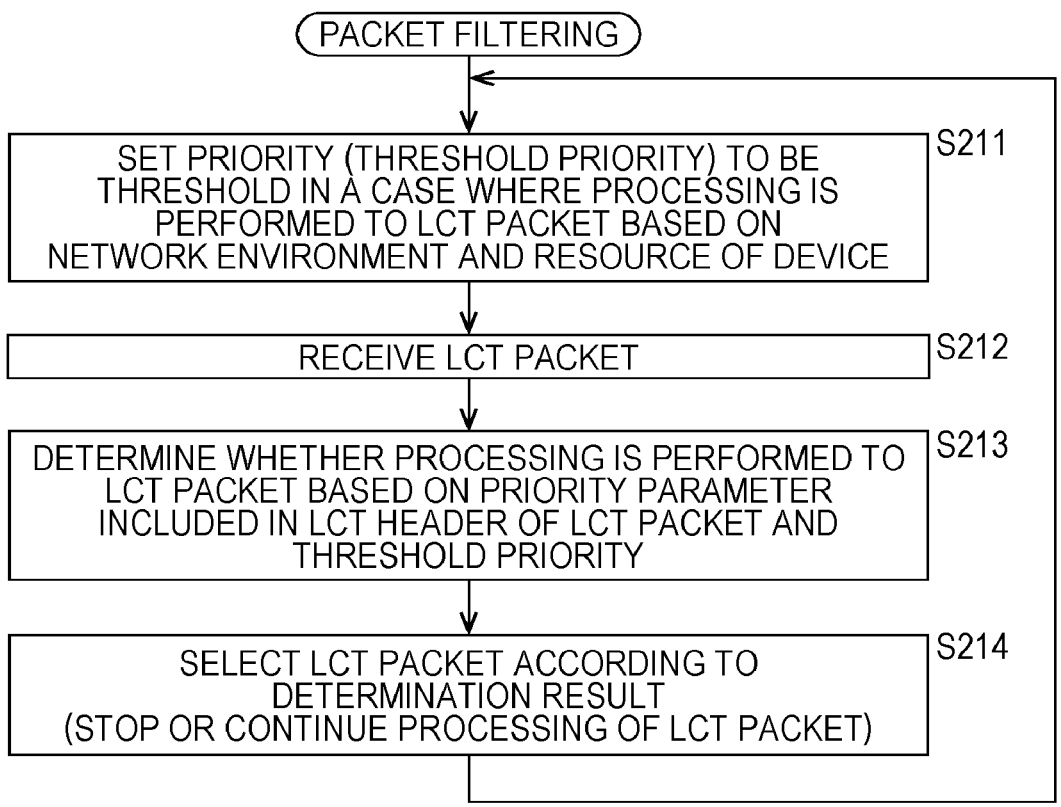
FIG. 25 is a flowchart to describe exemplary processing of packet filtering performed by the client 12.

FIG. 25 is a flowchart to describe exemplary processing of packet filtering performed by the client 12 (in addition, a device such as a router for receiving the LCT packet which is distributed by multicast).

The receiving unit 30 (FIG. 3) of the client 12 in step S211 sets a priority to be a threshold (referred to as a threshold priority below) of a case when the LCT packet is processed based on the network environment, the resource of the device (client 12), the operation of the user, and user's preference, and the procedure proceeds to step S212.

The receiving unit 30 in step S212 receives the LCT packet after waiting for the multicast distribution of the LCT packet, and the procedure proceeds to step S213.

The receiving unit 30 determines in step S213 whether the processing to the LCT packet can be performed based on the priority parameter included in the LCT header of the LCT packet received in step S212 and the threshold priority set in step S211, and the procedure proceeds to step S214.

In step S214, the receiving unit 30 selects the LCT packet according to the determination result determined in step S213, and the receiving unit 30 stops the processing to the LCT packet having the priority parameter with lower priority than the threshold priority and continues the processing to the LCT packet having the priority parameter with the priority equal to or higher than the threshold priority. The processing returns from step S214 to step S211, and similar processing is repeated after that.

<Description on Computer to which Present Technique is Applied>

Next, the above-mentioned series of processing can be performed by hardware and software. When the series of the processing is performed by the software, a program forming the software is installed in a general computer and the like.

Figure 26:
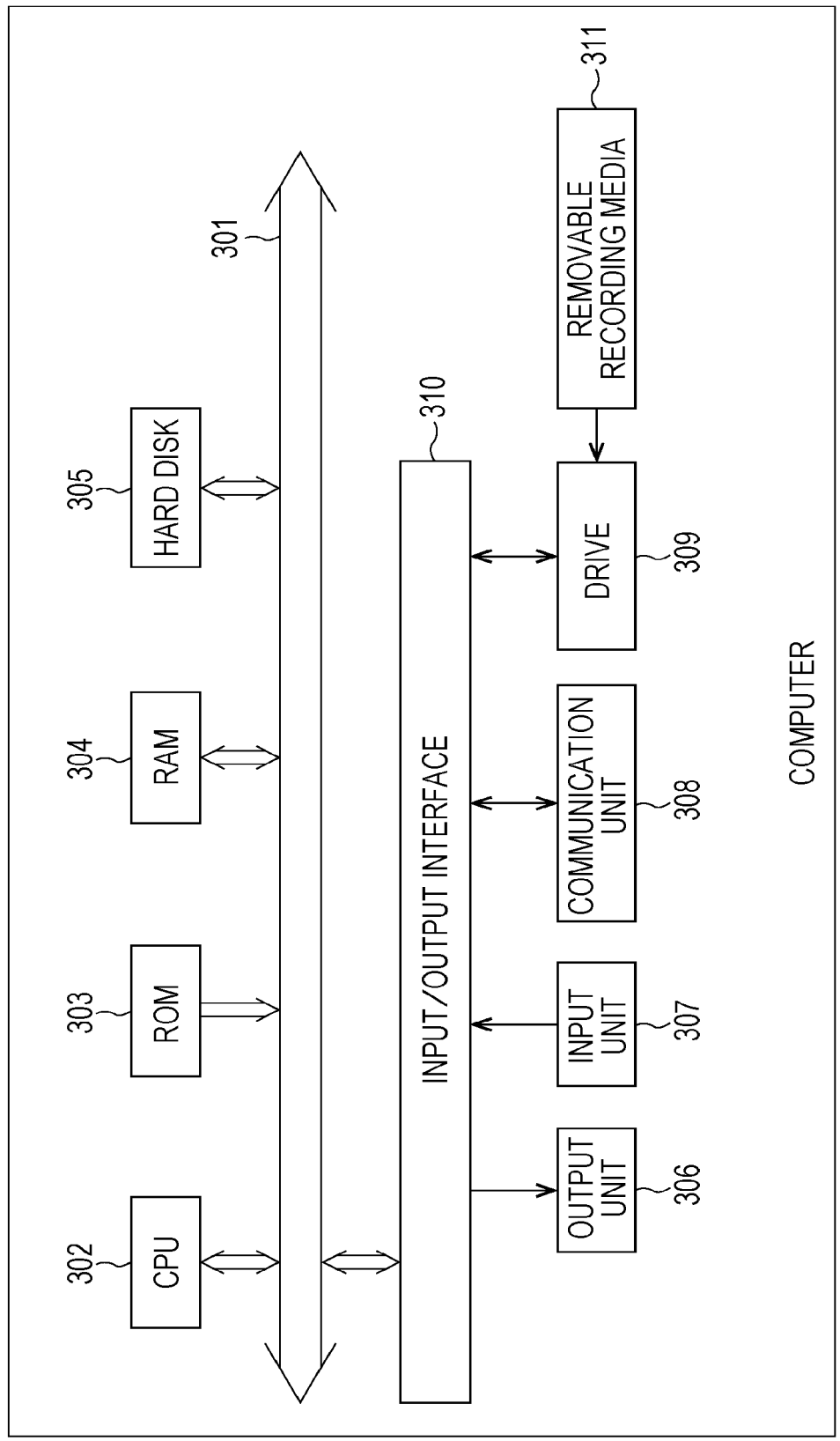
FIG. 26 is a block diagram of an exemplary structure of an embodiment of a computer to which the present technique has been applied.

FIG. 26 is a diagram of an exemplary structure of an embodiment of the computer to which the program for executing the series of processing is installed.

The program can be previously recorded to a hard disk 305 and a ROM 303 as recording media which is built in the computer.

Also, the program can be stored (recorded) in a removable recording media 311. The removable recording media 311 can be provided as a so-called package software. Here, for example, the removable recording media 311 is a flexible disk, a compact Disc read only memory (CD-ROM), a magneto optical (MO) disk, a digital versatile disc (DVD), a magnetic disk, a semiconductor memory, and the like.

The program is installed from the removable recording media 311 to the computer, and in addition, the program can be downloaded to the computer via a communications network and a broadcasting network and can be installed to the built-in hard disk 305. That is, for example, the program can be wirelessly forwarded from a download site to the computer via an artificial satellite for digital satellite broadcast and can be forwarded to the computer with a wire via a network such as a local area network (LAN) and the Internet.

The computer has a central processing unit (CPU) 302 therein, and the CPU 302 is connected to an input/output interface 310 via a bus 301.

When an instruction is input to the CPU 302 by an operation of an input unit 307 by the user via the input/output interface 310, the CPU 302 executes the program stored in the read only memory (ROM) 303 according to the instruction. Also, the CPU 302 loads the program stored in the hard disk 305 to a random access memory (RAM) 304 and executes it.

According to this, the CPU 302 performs processing according to the above-mentioned flowchart or processing performed by the structure of the block diagram. For example, the CPU 302 outputs the processing result from an output unit 306 via the input/output interface 310 as necessary or transmits the processing result from a communication unit 308. In addition, the CPU 302 records the processing result to the hard disk 305.

The input unit 307 is configured of a keyboard, a mouse, a microphone, and the like. Also, the output unit 306 is configured of a liquid crystal display (LCD), a speaker, and the like.

Here, in the present specification, it is not necessary to perform the processing, which is performed by the computer according to the program, in an order described in the flowchart in time series. That is, the processing performed by the computer according to the program includes processing performed in parallel or individually (for example, parallel processing or processing by object).

Also, the program may be performed by a single computer (processor), and distribution processing may be performed to the program by a plurality of computers. In addition, the program may be forwarded to a remote computer and be executed.

In addition, a system means herein an assembly of a plurality of components (devices, modules (parts), and the like), and it is not considered whether all the components are in the same housing. Therefore, both a plurality of devices respectively housed in different housings from each other and connected via the network and a single device having a plurality of modules housed in one housing are systems.

The embodiments of the present technology are not limited to the above-mentioned embodiment, and various changes can be made without departing from the scope of the present technique.

For example, the present technique may have a configuration of cloud computing in which a single function is divided by a plurality of devices via a network and the plurality of devices cooperates to perform the processing.

Also, each step described with reference to the above-mentioned flowchart can be performed by the single device and can be divided and performed by the plurality of devices.

In addition, when a plurality of processing is included in one step, the plurality of processing included in one step can be performed by the single device and can be divided and performed by the plurality of devices.

Also, in the segmenter 22, a fragment of fragmentedMP4 (ISO/IEC14496-14) and a fragment of any data format (a part of data) can be employed as the fragment to which the portion is generated.

That is, as the fragment to which the portion is generated, for example, a fragment including a data format having a so-called box structure such as an ISO base media file format (ISO/IEC 14496-12), a format specified by ISO/IEC 14496-15, a QuickTime format and a fragment in which data with a data format which does not has the box structure (for example, transport stream (TS) and the like) is fragmented can be employed.

In addition, as the fragment to which the portion is generated, for example, a fragment with a transport stream (TS) of MPEG, a webM, and any other moving image format can be employed.

Also, the present technique can be applied to distribution of data other than the content.

Here, the effects described herein are only exemplary and not limited to these. Also, there may be an additional effect.

The present technique can have a structure below.

<1>

A transmission apparatus including:

a distribution unit configured to distribute an http response including a part of a fragment and a hypertext transfer protocol (http) header including a sequence number representing an order of the fragment and a version representing an order of a part of the fragment in the fragment.

<2>

The transmission apparatus according to <1>, wherein the version of the http response including a last part of the fragment includes information indicating the last of the fragment.

<3>

The transmission apparatus according to <1> or <2>, wherein the fragment includes a moof (movie fragment) and a mdat (media data), the moof includes BaseMediaDecodeTime representing a presentation time of a first sample of the mdat, and the http header further includes a network time protocol (NTP) time corresponding to the BaseMediaDecodeTime.

<4>

The transmission apparatus according to <3>, wherein the http header still further includes sample count start information indicating an order of the first sample which is a part of the fragment included in the http response from the first sample of the fragment.

<5>

The transmission apparatus according to <4>, wherein the http header of the http response including a part of the second or later of the fragment includes the sample count start information.

<6>

The transmission apparatus according to any one of <1> to <5>, wherein the fragment is a fragment of fragmentedMP4.

<7>

A transmitting method including:

a step for distributing an http response including a part of a fragment and a hypertext transfer protocol (http) header including a sequence number representing an order of the fragment and a version representing an order of a part of the fragment in the fragment.

<8>

A reception apparatus including:

a receiving unit configured to receive an http response including a part of a fragment and a hypertext transfer protocol (http) header including a sequence number representing an order of the fragment and a version representing an order of a part of the fragment in the fragment.

<9>

The reception apparatus according to <8>, wherein
the version of the http response including a last part of the fragment includes information indicating the last of the fragment.

<10>

The reception apparatus according to <8> or <9>, wherein
the fragment includes a moof (movie fragment) and a mdat (media data),
the moof includes BaseMediaDecodeTime representing a presentation time of a first sample of the mdat, and
the http header further includes a network time protocol (NTP) time corresponding to the BaseMediaDecodeTime.

<11>

The reception apparatus according to <10>, wherein
the http header still further includes sample count start information indicating an order of the first sample which is a part of the fragment included in the http response from the first sample of the fragment.

<12>

The reception apparatus according to <11>, wherein
the http header of the http response including a part of the second or later of the fragment includes the sample count start information.

<13>

The reception apparatus according to any one of <8> to <12>, wherein
the fragment is a fragment of fragmentedMP4.

<14>

A receiving method including:
a step for receiving an http response including
a part of a fragment and
a hypertext transfer protocol (http) header including
a sequence number representing an order of the fragment and
a version representing an order of a part of the fragment in the fragment.

REFERENCE SIGNS LIST 10 network
11 distribution server
12 client
13 NTP server
21 channel streamer
22 segmenter
23 metadata generator
24 FLUTE streamer
25 multicast server
26 web server
30 receiving unit
31 middleware
32 DASH client
33 reproducing unit
301 bus
302 CPU
303 ROM
304 RAM
305 hard disk
306 output unit
307 input unit
308 communication unit
309 drive
310 input/output interface
311 removable recording media

The invention claimed is:

1. A transmission apparatus transmitting a stream of content via multicast or broadcast, the stream being segmented into segments, a segment of the segments comprising a plurality of fragments, the transmission apparatus comprising:
a transmitter configured to transmit a hypertext transfer protocol (http) response including a part of a fragment of the plurality of fragments and a http header, wherein the http header includes
a sequence number representing an order of the fragment with respect to other fragments of the plurality of fragments, and
a version representing an order of the part of the fragment with respect to other parts in the fragment.

2. The transmission apparatus according to claim 1, wherein the version of the http header of the http response includes information indicating a last part of the fragment.

3. The transmission apparatus according to claim 1,
wherein the http response is a first http response, the http header is a first http header, the part of a fragment is a first part,
wherein the transmitter is configured to transmit a second http response including a second part of the fragment and a second http header, and
wherein the second http header includes a version representing an order of the second part of the fragment with respect to other parts in the fragment.

4. The transmission apparatus according to claim 2, wherein
the fragment includes a movie fragment (moof) and a movie data (mdat),
the moof includes a BaseMediaDecodeTime representing a presentation time of a first sample of the mdat, and
the http header further includes a network time protocol (NTP) time corresponding to the BaseMediaDecodeTime.

5. The transmission apparatus according to claim 4, wherein the http header further includes sample count start information indicating an order of the first sample which is a part of the fragment included in the http response from the first sample of the fragment.

6. The transmission apparatus according to claim 5, wherein the http header of the http response including a part of the second or later of the fragment includes the sample count start information.

7. The transmission apparatus according to claim 6, wherein the fragment is a fragment of fragmented MP4.

8. A transmitting method for transmitting a stream of content via multicast or broadcast, the stream being segmented into segments, a segment of the segments comprising a plurality of fragments, the transmitting method comprising:
transmitting, by a transmitter, a hypertext transfer protocol (http) response including a part of a fragment of the plurality of fragments and a http header, wherein
the http header includes
a sequence number representing an order of the fragment with respect to other fragments of the plurality of fragments, and
a version representing an order of the part of the fragment with respect to other parts in the fragment.

9. A reception apparatus receiving a stream of content via multicast or broadcast, the stream being segmented into segments, a segment of the segments comprising a plurality of fragments, the reception apparatus comprising:

a receiver configured to receive a hypertext transfer protocol (http) response including a part of a fragment of the plurality of fragments and a http header, wherein the http header includes
- a sequence number representing an order of the fragment with respect to other fragments of the plurality of fragments, and
- a version representing an order of the part of the fragment with respect to other parts in the fragment.

10. The reception apparatus according to claim 9, wherein the version of the http header of the http includes information indicating a last part of the fragment.

11. The reception apparatus according to claim 10, wherein
the fragment includes a movie fragment (moof) and a movie data (mdat),
the moof includes a BaseMediaDecodeTime representing a presentation time of a first sample of the mdat, and
the http header further includes a network time protocol (NTP) time corresponding to the BaseMediaDecodeTime.

12. The reception apparatus according to claim 11, wherein the http header further includes sample count start information indicating an order of the first sample which is a part of the fragment included in the http response from the first sample of the fragment.

13. The reception apparatus according to claim 12, wherein the http header of the http response including a part of the second or later of the fragment includes the sample count start information.

14. The reception apparatus according to claim 13, wherein the fragment is a fragment of fragmented MP4.

15. A receiving method for receiving a stream of content via multicast or broadcast, the stream being segmented into segments, a segment of the segments comprising a plurality of fragments, the receiving method comprising:
receiving, by a receiver, a hypertext transfer protocol (http) response including a part of a fragment of the plurality of fragments and a http header, wherein the http header includes
- a sequence number representing an order of the fragment with respect to other fragments of the plurality of fragments, and
- a version representing an order of the part of the fragment with respect to other parts in the fragment.

16. The receiving method according to claim 15, wherein the http header further includes sample count start information indicating an order of the first sample which is a part of the fragment included in the http response from the first sample of the fragment.

17. The receiving method according to claim 16, wherein the http header of the http response including a part of the second or later of the fragment includes the sample count start information.

18. The receiving method according to claim 17, wherein the fragment is a fragment of fragmented MP4.

19. A non-transitory computer readable medium storing computer executable instructions which, when executed by a computer that transmits a stream of content via multicast or broadcast, the stream being segmented into segments, a segment of the segments comprising a plurality of fragments, cause the computer to:
transmit a hypertext transfer protocol (http) response including a part of a fragment of the plurality of fragments and a http header, wherein
the http header includes
- a sequence number representing an order of the fragment with respect to other fragments of the plurality of fragments, and
- a version representing an order of the part of the fragment with respect to other parts in the fragment.

* * * * *